United States Patent
Andrew et al.

(10) Patent No.: US 12,145,691 B2
(45) Date of Patent: Nov. 19, 2024

(54) CRANK IMPACT AND WEAR PROTECTION ARTICLE

(71) Applicant: Fox Factory, Inc., Duluth, GA (US)

(72) Inventors: Fraser Andrew, Burnaby (CA); Evan Michael Choltco-Devlin, North Vancouver (CA); Douglas Alexander Chalmers, Burnaby (CA); Robbie Roberts, Port Moody (CA); Marco Rota, Carvico (IT)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/752,537

(22) Filed: May 24, 2022

(65) Prior Publication Data

US 2023/0014123 A1    Jan. 19, 2023

Related U.S. Application Data

(60) Provisional application No. 63/192,958, filed on May 25, 2021.

(51) Int. Cl.
*B62M 3/08* (2006.01)

(52) U.S. Cl.
CPC .................... *B62M 3/08* (2013.01)

(58) Field of Classification Search
CPC ......... B62M 3/08; B62M 3/00; B29C 70/742; B62K 19/16; B62L 2031/3091; Y10T 74/2164
See application file for complete search history.

(56) References Cited

U.S. PATENT DOCUMENTS

| | | | |
|---|---|---|---|
| 2,451,690 A | 10/1948 | Oehler |
| 2,793,571 A | 5/1957 | Way et al. |
| 3,168,836 A | 2/1965 | Militana |
| 3,200,665 A | 8/1965 | Martin |
| 3,272,027 A | 9/1966 | Wayman |
| 3,304,796 A | 2/1967 | Leege |
| 3,371,549 A | 3/1968 | Ernst |
| 3,815,439 A | 6/1974 | Tarutani |
| 3,903,754 A | 9/1975 | Morroni |
| 3,905,248 A | 9/1975 | Peyrard |
| 3,987,539 A | 10/1976 | Gravener |
| 4,144,773 A | 3/1979 | Addicks |
| 4,174,642 A | 11/1979 | Martin et al. |
| 4,240,303 A | 12/1980 | Mosley |
| 4,261,214 A | 4/1981 | Watanabe et al. |
| RE30,758 E | 10/1981 | Lang |

(Continued)

FOREIGN PATENT DOCUMENTS

| | | | | |
|---|---|---|---|---|
| CA | 2964058 A1 | 10/2017 | | |
| CN | 2409135 Y | * 12/2000 | ............. | B62M 3/00 |

(Continued)

OTHER PUBLICATIONS

"Strip." Merriam-Webster.com Dictionary, Merriam-Webster, https://www.merriam-webster.com/dictionary/strip. Accessed Sep. 25, 2023 (Year: 2023).*

(Continued)

*Primary Examiner* — Vinh Luong

(57) ABSTRACT

A crank impact and wear protection article. The crank arm includes a crank body and an impact and wear protection article coupled with the crank body.

14 Claims, 11 Drawing Sheets

(56) References Cited

U.S. PATENT DOCUMENTS

| | | |
|---|---|---|
| 4,318,310 A | 3/1982 | Segawa |
| 4,331,043 A | 5/1982 | Shimano |
| 4,358,967 A | 11/1982 | Kastan |
| 4,392,841 A | 7/1983 | Juy |
| 4,439,172 A | 3/1984 | Segawa |
| 4,446,753 A | 5/1984 | Nagano |
| 4,453,924 A | 6/1984 | Sugino |
| 4,475,894 A | 10/1984 | Sugino |
| 4,545,691 A | 10/1985 | Kastan et al. |
| 4,583,422 A | 4/1986 | Boyd |
| 4,594,910 A | 6/1986 | Nagano |
| 4,598,608 A | 7/1986 | Ueno |
| 4,608,878 A | 9/1986 | Shimano |
| 4,722,722 A | 2/1988 | Rampe |
| 4,867,733 A | 9/1989 | Yamanoi et al. |
| 4,889,521 A | 12/1989 | Nagano |
| 5,003,840 A | 4/1991 | Hinschlager |
| 5,192,248 A | 3/1993 | Nagano |
| 5,192,249 A | 3/1993 | Nagano |
| 5,224,903 A | 7/1993 | Langhof et al. |
| 5,226,469 A | 7/1993 | Matsumura et al. |
| 5,246,402 A | 9/1993 | Romano |
| 5,285,701 A | 2/1994 | Parachinni |
| 5,362,278 A | 11/1994 | Bergles et al. |
| 5,413,534 A | 5/1995 | Nagano |
| 5,451,198 A | 9/1995 | Lancaster |
| 5,738,603 A | 4/1998 | Schmidt et al. |
| 5,830,096 A | 11/1998 | Schmidt et al. |
| 5,852,954 A | 12/1998 | Yamanaka |
| 5,908,364 A | 6/1999 | Tanaka |
| 5,935,033 A | 8/1999 | Tseng et al. |
| 5,947,852 A | 9/1999 | Moretz |
| 5,984,817 A | 11/1999 | Schulz |
| 6,007,442 A | 12/1999 | Schmidt |
| 6,013,001 A | 1/2000 | Miyoshi |
| 6,022,284 A | 2/2000 | Bartolozzi et al. |
| 6,102,821 A | 8/2000 | Nakamura |
| 6,202,506 B1 | 3/2001 | Storck et al. |
| 6,203,462 B1 | 3/2001 | Takamori |
| 6,564,675 B1 | 5/2003 | Jiang |
| 6,572,500 B2 | 6/2003 | Tetsuka |
| 6,656,072 B2 | 12/2003 | Sugita et al. |
| 6,666,786 B2 | 12/2003 | Yahata |
| 6,755,095 B2 | 6/2004 | Yamanaka |
| 6,860,171 B1 | 3/2005 | Nanko et al. |
| 7,080,574 B2 | 7/2006 | Chang |
| 7,263,914 B2 | 9/2007 | Ording et al. |
| 7,267,030 B2 | 9/2007 | French |
| 7,462,120 B1 | 12/2008 | Thompson |
| 7,503,864 B2 | 3/2009 | Nonoshita et al. |
| 7,530,290 B2 | 5/2009 | Lin |
| 7,610,832 B2 | 11/2009 | Guiseppe et al. |
| 7,686,721 B2 | 3/2010 | Tabe et al. |
| 7,699,733 B2 | 4/2010 | Sakura et al. |
| 7,713,156 B2 | 5/2010 | Sakura et al. |
| 7,753,815 B2 | 7/2010 | Saifuddin et al. |
| 7,824,287 B2 | 11/2010 | Nonoshita et al. |
| 7,850,564 B2 | 12/2010 | Nonoshita |
| 7,883,437 B2 | 2/2011 | Braedt |
| 7,942,771 B2 | 5/2011 | Kamada |
| 7,967,709 B2 | 6/2011 | Emura et al. |
| 8,025,304 B2 | 9/2011 | Smith |
| 8,057,338 B2 | 11/2011 | Kamada |
| 8,070,632 B2 | 12/2011 | Yuan |
| 8,096,908 B2 | 1/2012 | Oishi et al. |
| 8,226,511 B2 | 7/2012 | Kamada |
| 8,298,104 B2 | 10/2012 | Sakura |
| 8,479,610 B2 | 7/2013 | Valle et al. |
| 8,550,944 B2 | 10/2013 | Esquibel |
| 8,573,093 B2 | 11/2013 | Valle et al. |
| 8,616,084 B2 | 12/2013 | Meggiolan |
| 8,820,192 B2 | 9/2014 | Staples et al. |
| 8,882,619 B2 | 11/2014 | Braedt |
| 8,888,631 B2 | 11/2014 | Morita |
| 9,016,169 B2 | 4/2015 | Sugimoto et al. |
| 9,033,835 B2 | 5/2015 | Blank et al. |
| 9,302,736 B2 | 4/2016 | Iwai et al. |
| 9,308,967 B2 | 4/2016 | Braedt |
| 9,328,814 B2 | 5/2016 | Wesling et al. |
| 9,415,835 B2 | 8/2016 | Tokuyama et al. |
| 9,440,706 B2 | 9/2016 | Iwai et al. |
| 9,463,844 B2 | 10/2016 | Fukunaga |
| 9,493,211 B2 | 11/2016 | Reiter et al. |
| 9,540,070 B2 | 1/2017 | Watarai et al. |
| 9,580,144 B2 | 2/2017 | Bernardele |
| 9,631,714 B2 | 4/2017 | Watarai et al. |
| 9,677,658 B2 | 6/2017 | Wickliffe |
| 9,719,590 B2 | 8/2017 | Reiter et al. |
| 9,725,133 B2 | 8/2017 | Staples et al. |
| 9,791,033 B2 | 10/2017 | Wickliffe et al. |
| 9,869,382 B2 | 1/2018 | Wesling et al. |
| 9,914,502 B2 | 3/2018 | Wu |
| 9,919,763 B2 | 3/2018 | Iwai et al. |
| 9,926,038 B2 | 3/2018 | Fukunaga et al. |
| 9,932,090 B2 | 4/2018 | Yoshida et al. |
| 9,944,351 B2 | 4/2018 | Braun et al. |
| 9,963,196 B2 | 5/2018 | Sugimoto |
| 9,994,285 B2 | 6/2018 | Tokuyama et al. |
| 10,036,443 B2 | 7/2018 | Galasso et al. |
| 10,040,510 B2 | 8/2018 | Sugimoto et al. |
| 10,053,186 B2 | 8/2018 | Braedt et al. |
| 10,059,400 B2 | 8/2018 | Tokuyama et al. |
| 10,155,566 B2 | 12/2018 | Sugimoto |
| 10,221,887 B2 | 3/2019 | Dubois et al. |
| 10,315,724 B2 | 6/2019 | Nonoshita et al. |
| 10,358,186 B2 | 7/2019 | Sugimoto |
| 10,359,106 B2 | 7/2019 | Akanishi |
| 10,359,107 B2 | 7/2019 | Young |
| 10,377,445 B2 | 8/2019 | Hirose et al. |
| 10,407,127 B2 | 9/2019 | Sugimoto |
| 10,443,685 B2 | 10/2019 | Reiter |
| 10,507,888 B2 | 12/2019 | Sugimoto |
| 10,550,925 B2 | 2/2020 | Akanishi |
| 10,562,589 B2 | 2/2020 | Sugimoto et al. |
| 10,578,201 B2 | 3/2020 | Reiter et al. |
| 10,800,482 B2 | 10/2020 | Staples et al. |
| 10,994,804 B2 | 5/2021 | Sugimoto |
| 2002/0086753 A1 | 7/2002 | Yahata |
| 2003/0097900 A1 | 5/2003 | Yamanaka |
| 2003/0199351 A1 | 10/2003 | Nichols |
| 2004/0070166 A1 | 4/2004 | Valle |
| 2004/0092352 A1 | 5/2004 | Chiang |
| 2004/0200314 A1 | 10/2004 | Hermansen et al. |
| 2004/0204274 A1 | 10/2004 | Young |
| 2005/0009656 A1 | 1/2005 | Preis et al. |
| 2005/0014590 A1 | 1/2005 | Wen |
| 2005/0016323 A1* | 1/2005 | Dal Pra' .................. F16C 3/22 74/594.1 |
| 2005/0032596 A1 | 2/2005 | Nonoshita et al. |
| 2005/0039570 A1 | 2/2005 | Nanko et al. |
| 2005/0072264 A1 | 4/2005 | Yamanaka |
| 2005/0081678 A1 | 4/2005 | Smith |
| 2005/0090349 A1 | 4/2005 | Lee |
| 2005/0199092 A1 | 9/2005 | Feltrin et al. |
| 2005/0233850 A1 | 10/2005 | Andel |
| 2005/0282671 A1 | 12/2005 | Emura et al. |
| 2005/0282672 A1 | 12/2005 | Nonoshita |
| 2006/0033305 A1* | 2/2006 | Crozet .................. B62M 3/00 74/594.1 |
| 2006/0101940 A1 | 5/2006 | Okada |
| 2006/0205549 A1 | 9/2006 | Nonoshita et al. |
| 2006/0210734 A1 | 9/2006 | Lin |
| 2006/0288819 A1 | 12/2006 | Dal et al. |
| 2007/0034043 A1 | 2/2007 | Feltrin |
| 2007/0049437 A1 | 3/2007 | Wickliffe |
| 2007/0054768 A1 | 3/2007 | Miyazawa |
| 2007/0111833 A1 | 5/2007 | Young |
| 2007/0129193 A1 | 6/2007 | Nonoshita et al. |
| 2007/0137425 A1 | 6/2007 | Dal et al. |
| 2007/0173364 A1 | 7/2007 | Renshaw |
| 2007/0186718 A1 | 8/2007 | Chiang |
| 2007/0199403 A1 | 8/2007 | Ciavatta et al. |
| 2007/0227293 A1 | 10/2007 | Valle |
| 2007/0227294 A1 | 10/2007 | Valle |

(56) References Cited

U.S. PATENT DOCUMENTS

| | | |
|---|---|---|
| 2007/0265122 A1 | 11/2007 | Emura et al. |
| 2007/0270261 A1 | 11/2007 | Sakura et al. |
| 2007/0283781 A1 | 12/2007 | Meggiolan |
| 2008/0028887 A1 | 2/2008 | Valle et al. |
| 2008/0120845 A1 | 5/2008 | Hama |
| 2008/0176691 A1 | 7/2008 | Saifuddin et al. |
| 2008/0202284 A1 | 8/2008 | Valle et al. |
| 2008/0207369 A1 | 8/2008 | Bouchez |
| 2008/0272572 A1 | 11/2008 | Tsai |
| 2008/0314193 A1 | 12/2008 | Meggiolan |
| 2009/0042681 A1 | 2/2009 | Dal et al. |
| 2009/0042682 A1 | 2/2009 | Dal et al. |
| 2009/0105024 A1 | 4/2009 | Sakura et al. |
| 2009/0236777 A1 | 9/2009 | Chiang |
| 2009/0243160 A1 | 10/2009 | Chiang |
| 2009/0247337 A1 | 10/2009 | Sakura et al. |
| 2010/0064845 A1 | 3/2010 | French |
| 2010/0093494 A1 | 4/2010 | Smith |
| 2010/0326233 A1 | 12/2010 | Schlanger |
| 2011/0126666 A1 | 6/2011 | McAinsh |
| 2011/0247455 A1 | 10/2011 | Densmore |
| 2011/0319209 A1 | 12/2011 | Huang et al. |
| 2013/0011215 A1 | 1/2013 | Wells |
| 2013/0087011 A1* | 4/2013 | Yamanaka ............... B62M 3/00 74/594.1 |
| 2013/0087013 A1 | 4/2013 | Sugimoto et al. |
| 2013/0139642 A1 | 6/2013 | Reiter et al. |
| 2013/0184110 A1 | 7/2013 | Reiter |
| 2014/0335987 A1 | 11/2014 | Iwai et al. |
| 2014/0345419 A1* | 11/2014 | Staples ................. B62K 19/16 74/594.1 |
| 2015/0000459 A1* | 1/2015 | Nonoshita ............... B62M 3/00 74/594.1 |
| 2015/0082939 A1 | 3/2015 | Meyer et al. |
| 2015/0152231 A1 | 6/2015 | Ohki et al. |
| 2015/0175241 A1* | 6/2015 | Malloy .................... B62M 3/16 74/594.1 |
| 2015/0176692 A1 | 6/2015 | Roh |
| 2015/0198231 A1 | 7/2015 | Emura |
| 2015/0210352 A1 | 7/2015 | Sugimoto |
| 2015/0210353 A1 | 7/2015 | Tokuyama et al. |
| 2015/0211623 A1 | 7/2015 | Inui |
| 2015/0217834 A1 | 8/2015 | Iwai et al. |
| 2015/0266541 A1* | 9/2015 | Faupel ................ B29C 45/0005 74/594.1 |
| 2015/0337943 A1 | 11/2015 | Sugimoto |
| 2015/0360749 A1 | 12/2015 | Iwai et al. |
| 2015/0362057 A1 | 12/2015 | Wesling et al. |
| 2016/0114859 A1 | 4/2016 | Tsai et al. |
| 2016/0272279 A1 | 9/2016 | Yoshida et al. |
| 2017/0029066 A1 | 2/2017 | Fukunaga et al. |
| 2017/0146109 A1 | 5/2017 | Reiter et al. |
| 2017/0174288 A1 | 6/2017 | Wu |
| 2017/0183060 A1 | 6/2017 | Braedt |
| 2017/0234418 A1 | 8/2017 | Barefoot et al. |
| 2017/0247081 A1 | 8/2017 | Sugimoto |
| 2017/0274960 A1 | 9/2017 | Dubois et al. |
| 2017/0292598 A1 | 10/2017 | Moore et al. |
| 2018/0037296 A1 | 2/2018 | Hamamoto |
| 2018/0043203 A1 | 2/2018 | Seol |
| 2018/0057106 A1 | 3/2018 | Iwai et al. |
| 2018/0079467 A1 | 3/2018 | Hirose et al. |
| 2018/0127057 A1 | 5/2018 | Sugimoto |
| 2018/0134340 A1 | 5/2018 | Emura |
| 2018/0231060 A1 | 8/2018 | Milanesio et al. |
| 2018/0347680 A1 | 12/2018 | Akanishi |
| 2018/0362113 A1 | 12/2018 | Day |
| 2019/0017586 A1 | 1/2019 | Sugimoto |
| 2019/0085899 A1 | 3/2019 | Bernardele |
| 2019/0152558 A1 | 5/2019 | Staples et al. |
| 2019/0185108 A1 | 6/2019 | Bush et al. |
| 2019/0210677 A1 | 7/2019 | O'Reilly |
| 2020/0354016 A1* | 11/2020 | Di Serio ................. B21J 5/002 |
| 2021/0094652 A1 | 4/2021 | Staples et al. |
| 2022/0234307 A1* | 7/2022 | Escowitz ............... B29C 43/36 |
| 2023/0111794 A1* | 4/2023 | Lee ......................... B62M 1/36 74/594.1 |

FOREIGN PATENT DOCUMENTS

| | | | |
|---|---|---|---|
| CN | 1830722 A | 9/2006 | |
| CN | 200999089 Y | 1/2008 | |
| CN | 101224782 A | 7/2008 | |
| CN | 107380340 A | 11/2017 | |
| CN | 207773357 U | 8/2018 | |
| DE | 3130258 A1 | 6/1982 | |
| DE | 3531030 A1 | 3/1987 | |
| DE | 29513162 U1 | 10/1995 | |
| DE | 19751879 A1 | 5/1999 | |
| DE | 19954432 A1 | 5/2001 | |
| DE | 20218755 U1 | 2/2003 | |
| DE | 102015005673 A1 | 11/2015 | |
| DE | 202017107695 U1 | 3/2018 | |
| EP | 0144984 B1 | 4/1989 | |
| EP | 0538780 A1 | 4/1993 | |
| EP | 1270393 A1 | 1/2003 | |
| EP | 1281609 A2 | 2/2003 | |
| EP | 1352825 A1 | 10/2003 | |
| EP | 1426282 A2 | 6/2004 | |
| EP | 1493654 A1 | 1/2005 | |
| EP | 1619417 A2 | 1/2006 | |
| EP | 1884460 A2 | 2/2008 | |
| EP | 1884461 A2 | 2/2008 | |
| EP | 2423091 A1 | 2/2012 | |
| EP | 2886434 A1 * | 6/2015 | ............. B62M 3/00 |
| EP | 4095028 A1 * | 11/2022 | ............. B62M 3/00 |
| FR | 904975 A | 11/1945 | |
| FR | 946276 A | 5/1949 | |
| FR | 2501615 B1 | 4/1986 | |
| GB | 2005363 B | 6/1982 | |
| JP | H10181662 A | 7/1998 | |
| JP | 2005053410 A | 3/2005 | |
| KR | 20120053290 A | 5/2012 | |
| TW | 200821216 A | 5/2008 | |
| TW | 201530021 A | 8/2015 | |
| WO | 2007147909 A1 | 12/2007 | |
| WO | 2010136135 A1 | 12/2010 | |
| WO | 2015095933 A1 | 7/2015 | |

OTHER PUBLICATIONS

Translation of CN-2409135-Y, Leng, Dec. 6, 2000. (Year: 2000).*
Chinese First Action and Search Report, App No. 201710232829.8, 12 Pages, Dated Feb. 3, 2020.
Chinese Second Action and Search Report, App No. 2020011439469.7, 16 Pages, Dated Mar. 8, 2022.
European Examination Report, European Patent Application No. 17166123.4, 10 Pages, Dated Mar. 18, 2020.
Google Translation of Decision of Rejection for TW Appl. No. 106112061, Feb. 26, 2018 (Year: 2018).
Google Translation of Rejection for TW Appl. No. 106112061, Jul. 30, 2018 (Year. 2018).
Inverted trapezoid—Google Search, Oct. 4, 2019, (Year: 2019).
Machine Translation of Chinese First Action and Search Report, Appl. No. 201710232829.8, Feb. 3, 2020 (Year: 2020).
European Search Report, European Patent Application No. 17166123.4, Oct. 5, 2017, 9 Pages.
Decision of Rejection for TW Application No. 106112061 pp. 8, Feb. 26, 2018.
Decision of Rejection for TW Application No. 106112061 pp. 10, Jul. 30, 2018.
European Search Report for EP Application 22175487.2, dated Oct. 13, 2022, 7 Pages.

* cited by examiner

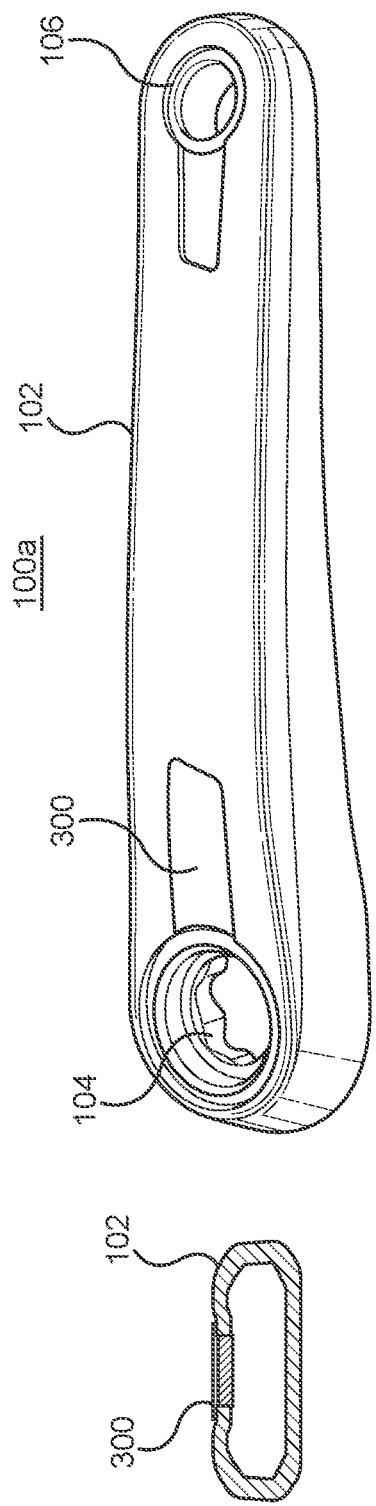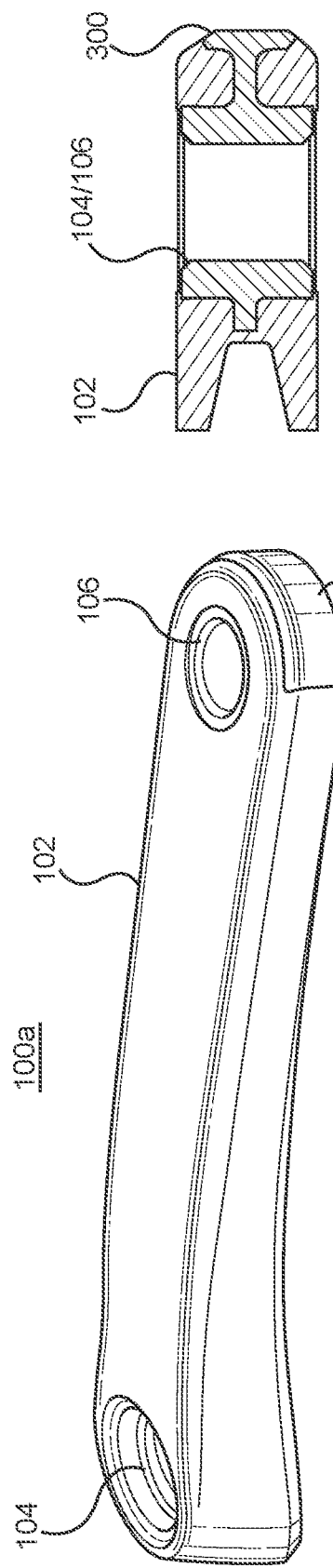

CRANK IMPACT AND WEAR PROTECTION ARTICLE

CROSS REFERENCE

This application claims priority to and benefit of U.S. Provisional Patent Application No. 63/192,958 filed on May 25, 2021, entitled "Carbon Crank Impact And Wear Protection Article" by Andrew et al. and assigned to the assignee of the present application, the disclosure of which is hereby incorporated herein by reference in its entirety.

FIELD OF THE INVENTION

Embodiments of the invention generally relate to bicycle components such as crank arms and methods for making bicycle components.

BACKGROUND

Typically, crank arms are designed based on a compromise of strength versus weight versus cost. Often the crank arm will meet the design compromises using strong and lightweight materials with reasonable associated costs. However, these materials often have low hardness and/or poor wear resistance. During pedaling and descending the user's shoes are very close to the crank arms and often rub on (e.g., abrade) the crank arm during most if not every pedal stroke. In adverse conditions and environments (like mud, sand, grit, dirt, etc.) this abrasion can be significantly increased. During the life of the crank arm the wear can become bad enough to compromise the structural integrity of the crank arm. Similarly, impacts from objects such as rocks, roots, and the like can also cause structural damage to the crank arm.

BRIEF DESCRIPTION OF THE DRAWINGS

Aspects of the present invention are illustrated by way of example, and not by way of limitation, in the accompanying drawings, wherein:

FIG. 8A is a perspective view of the crank arm with an impact and wear protection article formed in one or both of the spindle insert and the pedal insert, in accordance with an embodiment.

FIG. 8B is a cross-section view of a section of the crank arm of FIG. 8A, in accordance with an embodiment.

FIG. 9A is a perspective view of the crank arm with another style of impact and wear protection article formed in one or both of the spindle insert and the pedal insert, in accordance with an embodiment.

FIG. 9B is a cross-section view of a section of the crank arm of FIG. 9A, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, the crank arm is used to transmit a force that the user applies on a pedal to the chainring. In other words, a force from the user is transmitted from the pedal to the crank arm which is fixedly coupled to the chainring such that the chain (or the like) rotatable about the chainring can deliver the force to the rear wheel.

The crank arm locates the pedals in relation to the bicycle frame and often comes under harsh loads such as during encounters with obstacles, jumps, landings, descents, ascents, and the like. Moreover, the crank arm is also susceptible to wear and damage from external objects such as, but not limited to, a user's shoes rubbing thereagainst, impacts with obstacles (such as, but not limited to, rocks, roots, branches, and the like), sand, dirt, mud, and or other abrasive materials that may increase abrasion to the crank arm (to include the interaction between the user's footwear and the crank arm), and the like.

A protective crank arm article(s) is described herein. In one embodiment, the impact and wear protection article has a designed thickness and strength to protect the structural element of the crank arm once coupled with the crank arm. In one embodiment, the protective crank arm article will help prevent catastrophic failure modes that crank arms typically see while also adding strength to the crank arm structure while also providing wear and impact protection.

In the following discussion, and for purposes of clarity, a bicycle is utilized as an example vehicle. However, in another embodiment, the disclosed features could be used on one or more of a variety of vehicles such as, but not limited to, a bicycle, an electric bike (e-bike), a hybrid bike, a moped, a unicycle, or another vehicle that utilizes one or more crank arms.

Figure 1:
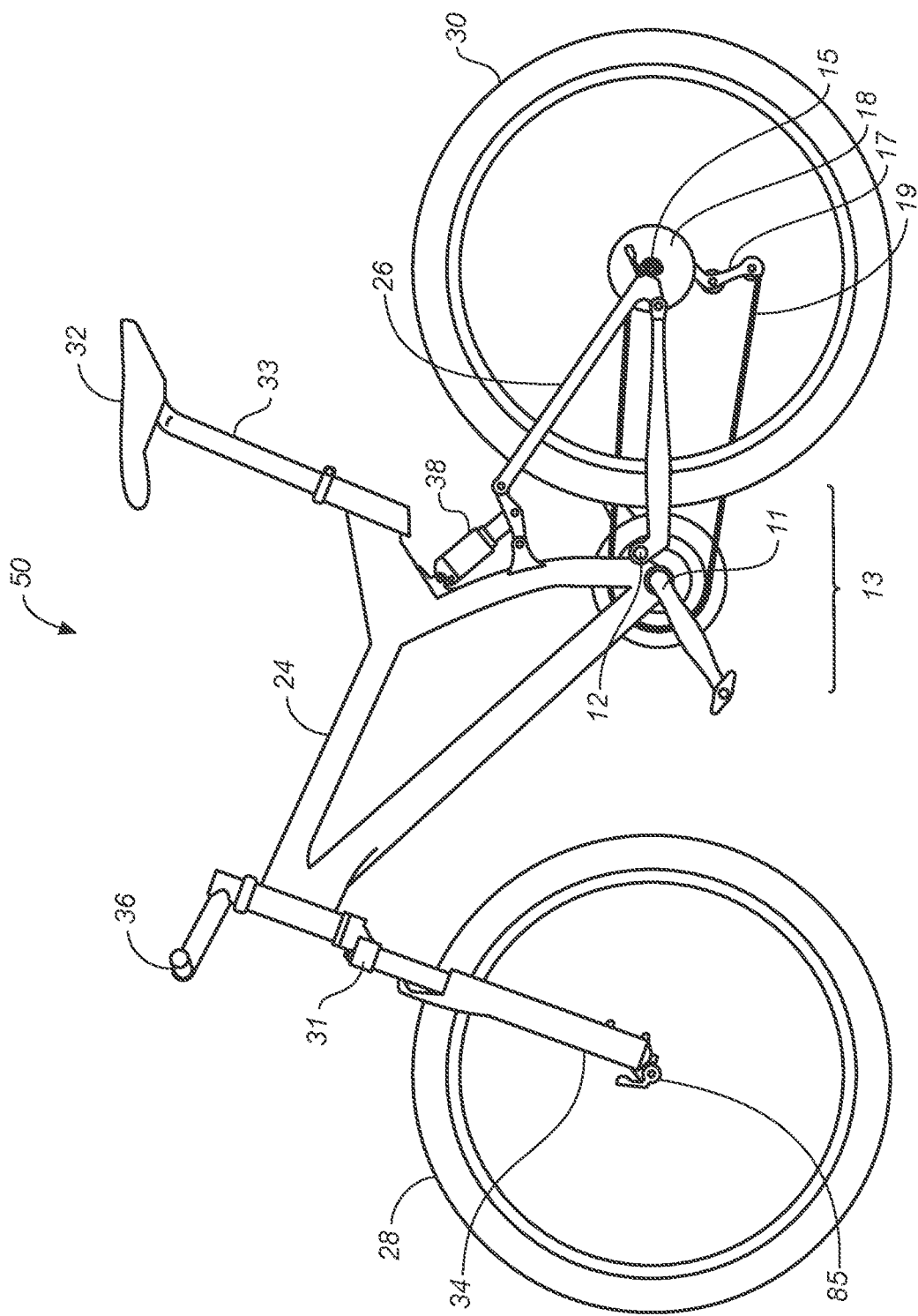
FIG. 1 is a perspective view of a bicycle, in accordance with an embodiment.

Referring now to FIG. 1, a perspective view of a bicycle 50 is shown in accordance with an embodiment. In one embodiment, bicycle 50 has a frame 24 with a suspension system comprising a swing arm 26 that, in use, is able to move relative to the rest of frame 24; this movement is permitted by, inter alia, rear shock assembly 38. The front fork assembly 34 also provide a suspension function via a shock assembly in at least one fork leg.

In one embodiment, bicycle 50 is a full suspension bicycle. In another embodiment, bicycle 50 has only a front suspension and no rear suspension (e.g., a hard tail). In different embodiments, bicycle 50 could be a road bike, a mountain bike, a gravel bike, an electric bike (e-bike), a hybrid bike, a motorcycle, or the like.

In one embodiment, swing arm 26 is pivotally coupled with the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and crank assembly 13. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 34 via front axle 85. In one embodiment, front fork assembly 34 includes a crown 31. In one embodiment, a portion of front fork assembly 34 (e.g., a steerer tube) passes through the frame 24 and couples with handlebar assembly 36. In so doing, the front fork assembly and handlebars are rotationally coupled with the frame 24 thereby allowing the rider to steer the bicycle 50.

In one embodiment, bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

In one embodiment, bicycle 50 is driven by a chain 19 that is coupled with both crank assembly 13 and rear sprocket 18. As the rider pedals, the rotational input to crank arms (e.g., crank arm 100a and crank arm 100b of FIG. 2) cause the crank assembly 13 to rotate about bottom bracket axis 11. This rotation applies a force to chain 19 which transfers the rider generated rotational energy to rear sprocket 18 which results in the rotation of rear wheel 30. Chain tension device 17 provides a variable amount of tension on chain 19. The need for chain 19 length variation can be due to a number of different gears that may be on one or both of crank assembly 13 and/or rear sprocket 18 and/or changes in chain stay length as the distance between bottom bracket axis 11 (where crank assembly 13 couples to frame 24) and the rear axle 15 changes due to suspension articulation.

In one embodiment, saddle 32 is connected to the frame 24 via seatpost 33. In one embodiment, seatpost 33 is a dropper seatpost.

In one embodiment, bicycle 50 may include one or more active suspension components, sensors, and the like, such as disclosed in U.S. Pat. No. 10,036,443 which is incorporated by reference herein, in its entirety.

Figure 2:
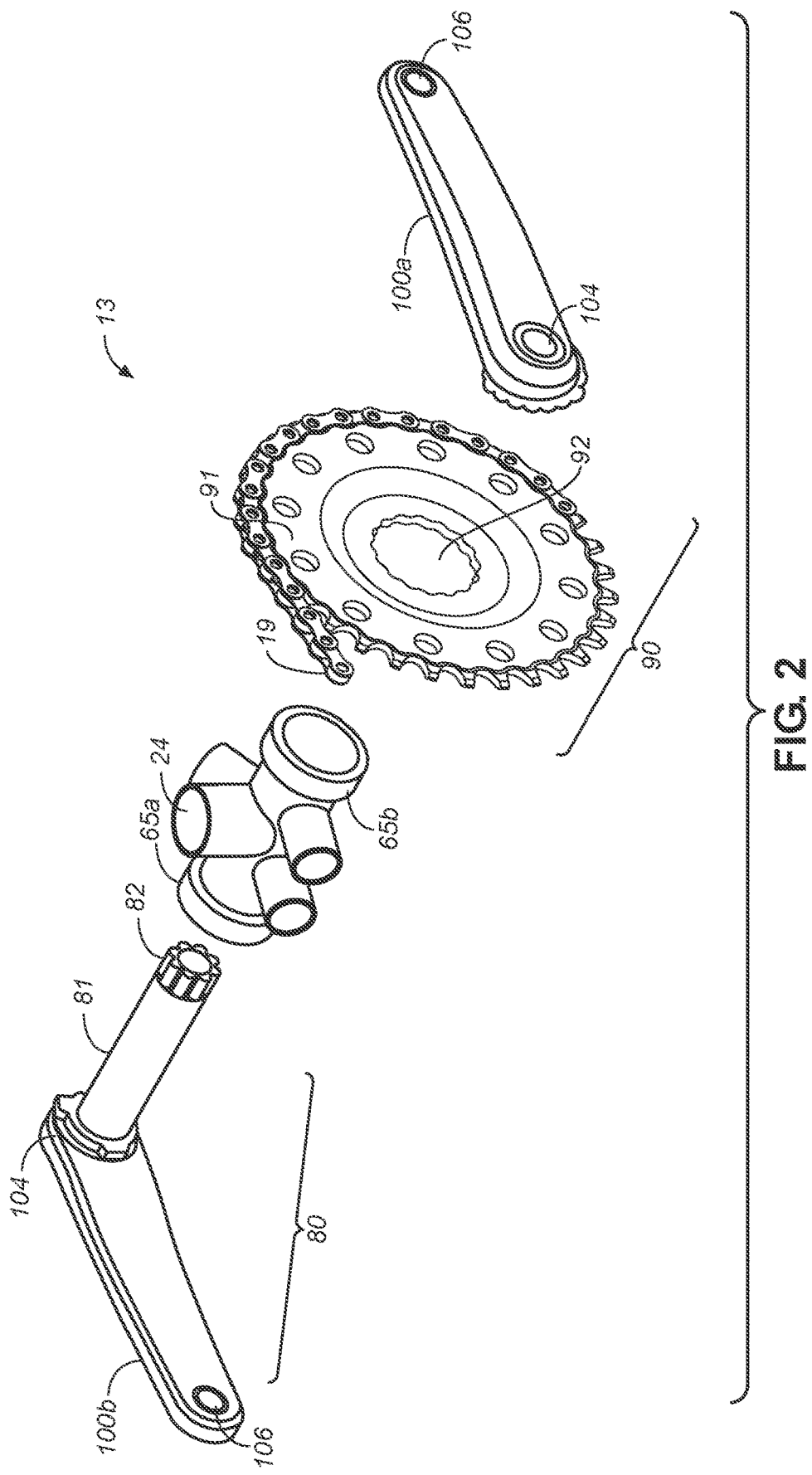
FIG. 2 is an exploded view of a crank assembly, in accordance with an embodiment.

Referring now to FIG. 2, an exploded view of a crank assembly 13 is shown in accordance with an embodiment. In FIG. 2, crank assembly 13 is shown in conjunction with a portion of bicycle frame 24. In one embodiment, bicycle frame 24 includes a bottom bracket shell 65a and a bottom bracket shell 65b.

In one embodiment, crank assembly 13 includes a left-hand non-drive side crank assembly 80 which includes a left-hand crank arm 100b and a spindle 81 that, in one embodiment includes a spindle interface 82.

In one embodiment, crank assembly 13 includes a right-hand drive side crank assembly 90 which includes a right-hand drive side crank arm 100a, a chainring 91 with opening 92, and a roller chain 19. In one embodiment, crank assembly 13 includes additional parts such as, pedals, pedal washers, dust caps, spindle spacers, bearings, hex nuts, and the like. Those parts are not shown for purposes of clarity.

In one embodiment, crank arm 100a (and similarly crank arm 100b) includes a spindle insert 104 and a pedal insert 106. Spindle insert 104 is used to receive and couple the crank arm (e.g., crank arm 100a and 100b) with spindle 81 and pedal insert 106 is used to receive and couple the pedal with the crank arm 100a (and similarly crank arm 100b).

In one embodiment, one or both of spindle insert 104 and pedal insert 106 are formed during manufacture of the crank arm via milling, casting, stamping, etc. In one embodiment, one or both of spindle insert 104 and pedal insert 106 are preformed inserts added to the crank arm during manufacture. In one embodiment, one or both of spindle insert 104 and pedal insert 106 are a similar material to that of the crank arm. For example, in one embodiment, the crank arm, spindle insert 104, and pedal insert 106 are a similar metal or metal alloy (such as aluminum, titanium, steel, etc.), a composite, a nylon, plastic, etc. In one embodiment, one or both of spindle insert 104 and pedal insert 106 are a different material than that of the crank arm. For example, in one embodiment, one or both of spindle insert 104 and pedal insert 106 are made from metal or a metal alloy such as aluminum, titanium, steel, etc., while the crank arm is a composite, plastic, nylon, or the like.

In one embodiment, e.g., during manufacture, assembly, maintenance, rebuild, component replacement, and the like of left-hand non-drive side crank assembly 80, spindle 81 is coupled with left-hand crank arm 100b. In one embodiment, spindle 81 is fixedly coupled with left-hand crank arm 100b at the time of manufacture and/or assembly. In one embodiment, spindle 81 and left-hand crank arm 100b are manufactured as a single component. In one embodiment, spindle 81 and left-hand crank arm 100b are two distinctly different components removably coupled at the time of assembly.

In one embodiment, e.g., during manufacture and/or assembly of the right-hand drive side crank assembly 90, chainring 19 is coupled with right-hand drive side crank arm 100a. In one embodiment, chainring 91 is fixedly coupled with right-hand drive side crank arm 100a at the time of manufacture and/or assembly. In one embodiment, chainring 91 and right-hand drive side crank arm 100a are manufactured as a single component. In one embodiment, chainring 91 and right-hand drive side crank arm 100a are two distinctly different components removably coupled at the time of assembly.

In one embodiment, to install the crank assembly 13 into frame 24 of bicycle 50, spindle 81 is inserted through a portion of bicycle frame 24 (including bottom bracket shell 65a and bottom bracket shell 65b) and opening 92 of chainring 91. Spindle interface 82 is coupled with spindle insert 104 on right-hand drive side crank assembly 90.

During the installation of crank assembly 13 into frame 24, one or more bearings (or the like) will be placed around spindle 81 and between bottom bracket 222 and bottom bracket shell 65a before spindle 81 is inserted into frame 24. Once spindle 81 is passed through frame 24, one or more bearings (or the like) will be placed around spindle 81 and between pedal insert 106 and bottom bracket shell 65b. In one embodiment, the one or more bearings (or the like) allow the rotational movement of spindle 81 within the frame 24 while also maintaining a fixed and proper orientation of spindle 81 within frame 24.

In one embodiment, one or more of the components of crank assembly 13 (such as, but not limited to, crank arm 100a and 100b, spindle insert 104, pedal insert 106, spindle 81, bottom bracket shell 65a, bottom bracket shell 65b, chainring 91, and the like) include one or a combination of materials such as an aluminum alloy, a titanium alloy, steel, other metal alloys, metals, ceramic, or the like.

In one embodiment, one or more of the components of crank assembly 13 include one or a combination of composite materials such as materials with a thermoset or thermoplastic matrix, a long or short fiber-reinforced composite, a long or short fiber thermoplastic or thermoset composite, injection molded carbon fiber, carbon fiber reinforced nylon, carbon fiber reinforced epoxy resin, glass filled nylon, a compression molded material, composite layering, chopped carbon fibers, aramid fibers, glass fibers, high-modulus polyethylene, plastic, a polymer, long fiber-reinforced plastics, short-fiber reinforced plastics, or the like.

In one embodiment, one or more of the components of crank assembly 13 include a combination of the above materials, e.g., a composite/metal hybrid. The crank assembly 13 can be manufactured by a variety of methods such as compression molding, bladder molding, vacuum molding, resin transfer molding (RTM), filament winding, automated fiber placement (AFP), automated tape laying (ATL), or the like.

Further detail regarding formation, manufacture, and the like of the crank arm(s), spindle insert(s), and pedal insert(s) are disclosed in U.S. Pat. Nos. 8,820,192; 9,725,133; 10,800,482; and any of the associated family of Patents and Applications, each of which are incorporated by reference herein, in their entirety.

Figure 3:
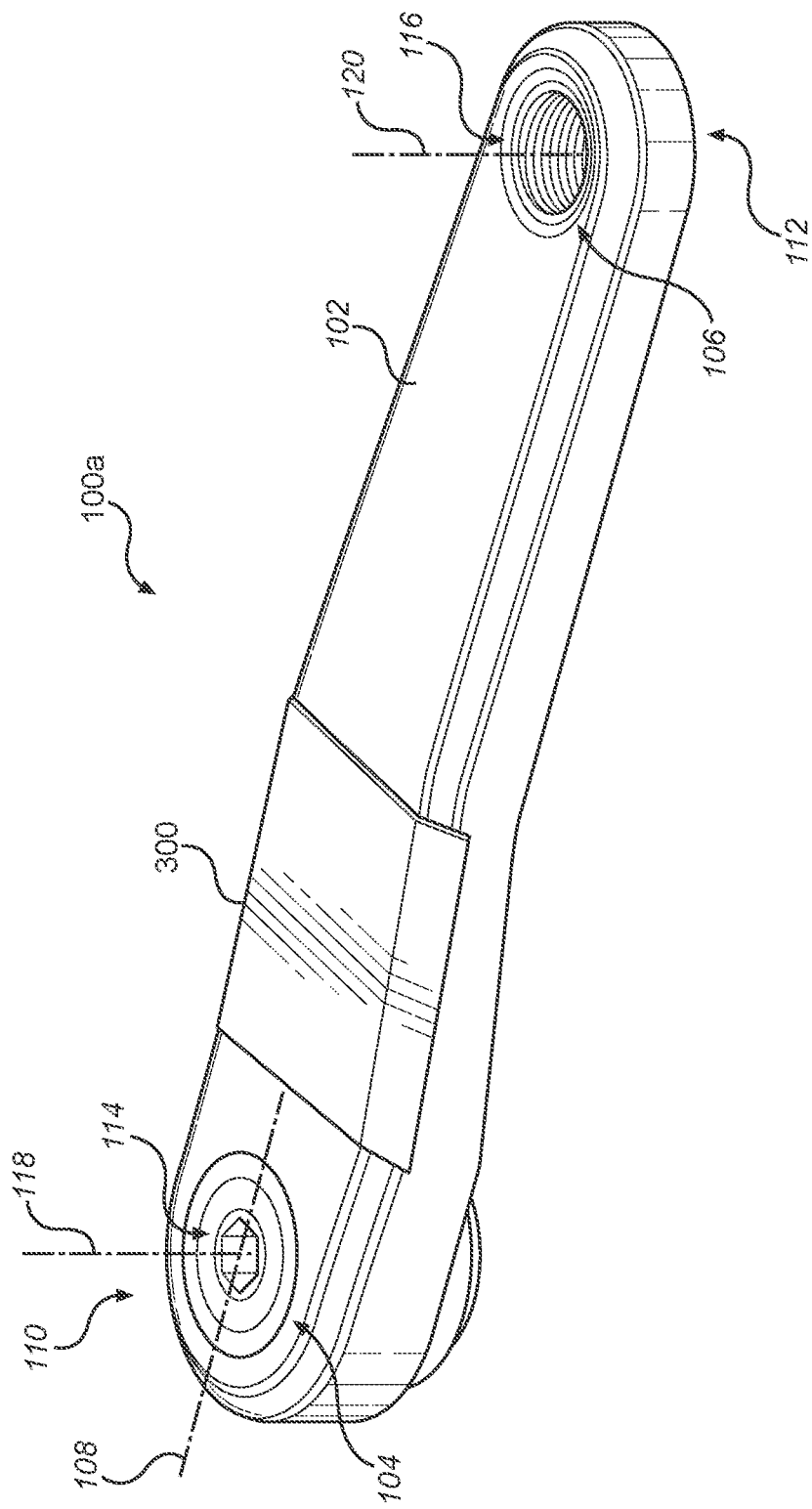
FIG. 3 is a perspective view of an example of a crank arm with an impact and wear protection article, in accordance with an embodiment.

Referring now to FIG. 3, one example of a crank arm 100a with an impact and wear protection article 300 is shown in accordance with an embodiment. In one embodiment, crank arm 100a includes a crank arm body 102, spindle insert 104, pedal insert 106, and impact and wear protection article 300. In one embodiment, crank arm 100a may include one or more inserts such as, but not limited to, a stringer insert, another type of structural insert, and the like.

In the following discussion, crank arm 100a is used as the example crank arm for purposes of clarity. However, it should be understood that in the following discussion, crank arm 100a is representative of both drive side crank arm 100a and non-drive side crank arm 100b except where identified. Similarly, while in the following discussion, crank arm 100a is representative of both drive side crank arm 100a and non-drive side crank arm 100b, it should be appreciated that in one embodiment the same layout and/or configuration is used for both drive side crank arm 100a and non-drive side crank arm 100b. However, in another embodiment, a different layout and/or configuration may be used for each of drive side crank arm 100a and non-drive side crank arm 100b.

Crank arm body 102 is generally elongate and extends along a body axis 108 between a first end 110 and a second end 112. In one embodiment, spindle insert 104 is fixedly coupled with crank arm body 102 and facilitates coupling with spindle 81, while pedal insert 106 is fixedly coupled with crank arm body 102 and facilitates coupling with a pedal or pedal assembly.

In one embodiment, crank arm body 102 is formed from at least one composite material such as a composite material comprising carbon fiber, fiberglass, aramid fiber, boron fiber, beryllium fiber, metal, plastic, or a polymer. In one embodiment, spindle insert 104 and/or pedal insert 106 are formed from a material (such as aluminum, steel, titanium, other metals and metal alloys, composites, polymers, plastics, and/or the like) having the structural strength required to support the connection with the spindle 81 and the pedal.

In one embodiment, crank arm body 102 is a long slender "Composite body" having a length which is multiple times larger than the width or thickness. In one embodiment, crank arm body 102 is made of a thermoset or thermoplastic matrix material and a reinforcing fiber material, the center of which can be solid, hollow, and/or where some, a portion, or all of center can include a supportive matrix structure. In one embodiment, the crank arm 100a has two interfaces spaced a set distance apart.

In one embodiment, each of spindle insert 104 and pedal insert 106 includes a central bore or aperture (e.g., bore 114 and bore 116 respectively) configured to accommodate a fastener. The bores 114 and 116 may be threaded or otherwise configured to mate with a corresponding fastener. In one embodiment, spindle insert 104 extends along axis 118 and pedal insert 106 extends along axis 120. In one embodiment, axis 118 and axis 120 are parallel.

In one embodiment, one or both of pedal insert 106 and/or spindle insert 104 are formed during the manufacture of crank arm body 102. For example, one or both of pedal insert 106 and/or spindle insert 104 may be cast (milled, printed, or otherwise formed) as an integral part of crank arm body 102.

In one embodiment, one or both of pedal insert 106 and/or spindle insert 104 are metallic (or other materials described herein) inserts placed in a composite material used to form crank arm body 102 before curing. In one embodiment, the spindle insert 104 includes one or more undercut(s) configured to be embedded in and encased by the crank arm body 102. When the composite cures around one or both of pedal insert 106 and/or spindle insert 104 it creates a single structure (e.g., crank arm 100a). In general, pedal insert 106 creates a robust interface to couple a pedal thereto. In one embodiment, the pedal is threaded into the robust pedal insert 106 which allows for repeated removal and fitting thereof. Similarly, the spindle insert 104 is used to create a robust interface to couple a spindle and sometimes chainring which is used to transmit load from the composite crank arm body 102 to the spindle 81 or chainring 91. In one embodiment, the spindle insert 104 allows repeated installation and/or removal of the spindle 81 and chainring 91 while also allowing threaded fasteners/lockrings to be fitted thereto.

Figure 4A:
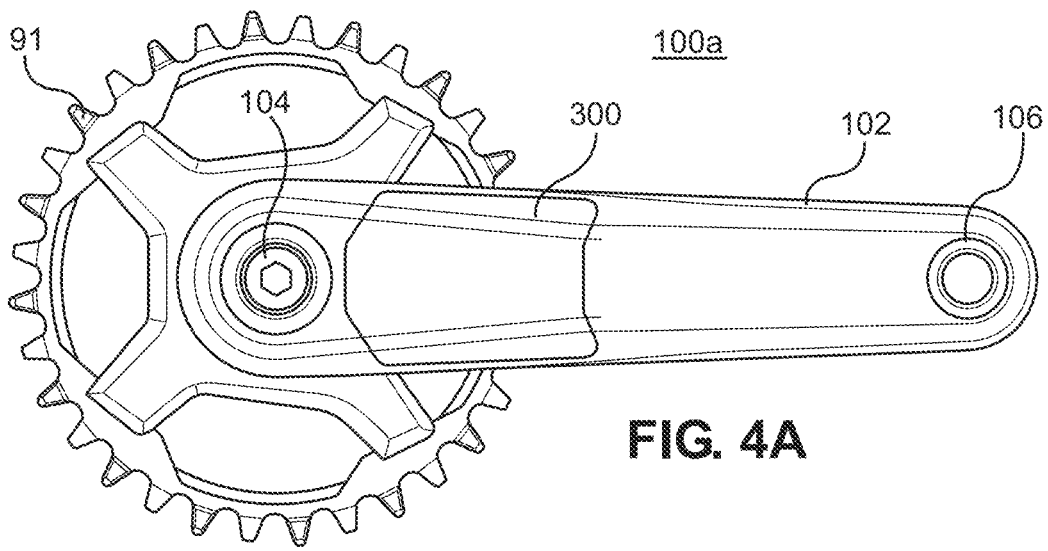
FIG. 4A is a side view of a crank arm with an impact and wear protection article located at a portion of a crank arm body, in accordance with an embodiment.

Referring now to FIG. 4A, a side view of a crank arm 100a with an impact and wear protection article 300 located at a portion of a crank arm body 102 is shown in accordance with an embodiment. In general, the impact and wear protection article 300 is stamped, milled, formed, shaped, etc. such that it matches the shape and/or contours of the crank arm body 102. In one embodiment, the impact and wear protection article 300 is one or more plate(s) and/or strip(s) that is fixedly coupled with the crank arm 100a to provide a hard or durable surface to protect the underlying crank arm body 102. The impact and wear protection article 300 can be a metal or metal alloy (such as aluminum, steel, etc.), rubber, plastic, a composite material, or any combination thereof.

In one embodiment, the impact and wear protection article 300 will provide impact protection by spreading the force of an impact over a larger area. In one embodiment, the thickness of the impact and wear protection article 300 is approximately 0.1 to approximately 1 mm. In another embodiment, the thickness of the impact and wear protection article 300 can range from approximately 0.1 mm to approximately 3 mm. In yet another embodiment, a cross-section of the impact and wear protection article 300 ranges from approximately 0.1 mm to approximately 10 mm.

Figure 4B:
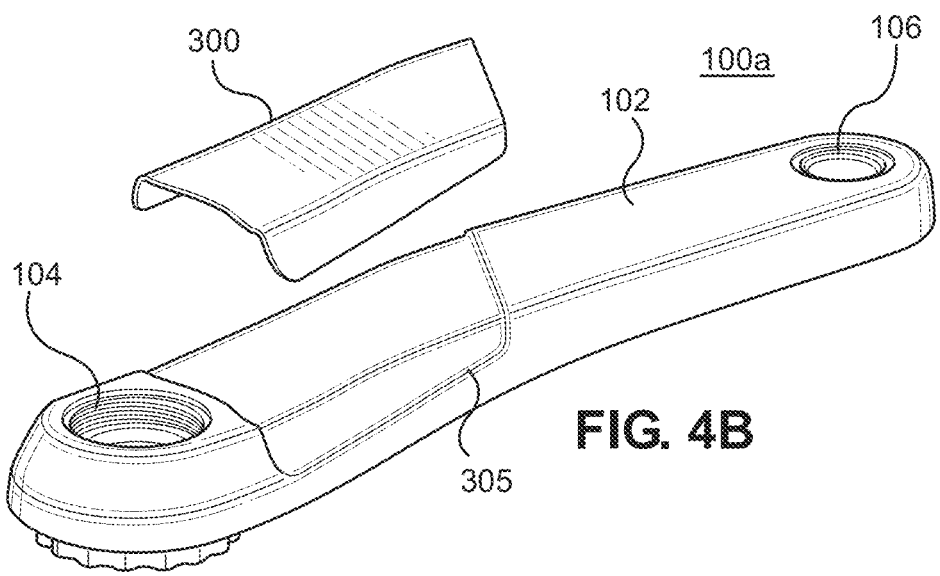
FIG. 4B is an exploded view of the crank arm with the impact and wear protection article of FIG. 4A with a recess formed therein, in accordance with an embodiment.

With reference now to FIG. 4B, an exploded view of the crank arm 100a with the impact and wear protection article 300 of FIG. 4A with a recess 305 formed therein is shown in accordance with an embodiment. Although one recess 305 is shown, it should be appreciated that there may be more than one recess 305 in a crank arm body 102 to allow for more than one impact and wear protection article 300.

In one embodiment, the size of the recess 305 is based on the size of at least a portion of the impact and wear protection article 300. By providing recess 305 in the crank arm body 102, the impact and wear protection article 300 can be installed flush with the surface plane of crank arm body 102, it could be raised above the surface plane of crank arm body 102, or it can be installed below the surface plane of crank arm body 102. In one embodiment, the recess 305 could be formed such that the impact and wear protection article 300 is above, flush, and/or recessed at different points along the crank arm body 102.

In one embodiment, the depth of recess 305 takes into account the thickness of impact and wear protection article 300 as well as the thickness of adhesive and/or tape used to couple impact and wear protection article 300 with crank arm body 102.

Figure 4C:
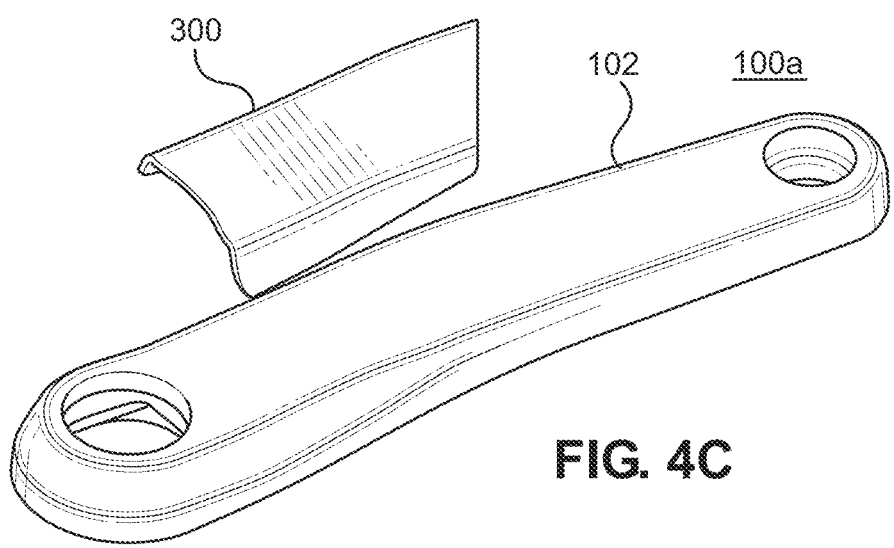
FIG. 4C is an exploded view of the crank arm with the impact and wear protection article of FIG. 4A without a recess formed therein, in accordance with an embodiment.

Referring now to FIG. 4C, an exploded view of the crank arm 100a with the impact and wear protection article 300 of FIG. 4A without a recess formed therein is shown in accordance with an embodiment. In general, if there is no recess 305, then impact and wear protection article 300 will be located above the surface plane of crank arm body 102.

In one embodiment, the impact and wear protection article 300 is shaped such that it can be snapped into the desired position on at least one of crank arm body 102, the spindle insert 104, and the pedal insert 106. In one embodiment, there may be one or more features formed on at least one of crank arm body 102, the spindle insert 104, and the pedal insert 106 to allow impact and wear protection article 300 to fixedly snap into place. In one embodiment, an adhesive such as epoxy, urethane, acrylic setting adhesive or a double-sided adhesive tape, or the like is used to couple the impact and wear protection article 300 to at least one of the crank arm body 102, the spindle insert 104, and the pedal insert 106. In one embodiment, the adhesive is a softer material than both the crank arm body 102 and the impact and wear protection article 300, so it can help dissipate the impact energy and spread the load across the crank arm body 102 thereby preventing structural damage to the crank arm body 102 structure.

In one embodiment, the coupling of impact and wear protection article 300 with at least one of crank arm body 102, the spindle insert 104, and the pedal insert 106 is a permanent attachment.

In one embodiment, the coupling of impact and wear protection article 300 with at least one of crank arm body 102, the spindle insert 104, and the pedal insert 106 is a semi-permanent attachment to allow for repair and/or replacement of the impact and wear protection article 300.

In the following discussion of FIGS. 5A-14B, a number of different mounting locations, attachment styles, shapes, and impact and wear protection articles are shown. It should be appreciated in the following discussion that in different embodiments, one or more than one impact and wear protection article 300 may be mounted on crank arm body 102 in a recess such as recess 305 of FIG. 4B, without a recess (as shown in FIG. 4C), or in a combination of recess and not recessed locations on crank arm body 102.

Further, although a number of different mounting solutions are shown, it should be appreciated that in different embodiments, the impact and wear protection article 300 may cover the whole crank arm body 102 or a portion of the crank arm body 102. In one embodiment, the impact and wear protection article 300 covers at least a portion of a front surface of the crank arm body 102 (the surface directed towards a user's leg). In one embodiment, the impact and wear protection article 300 is placed in the middle portion of the crankarm crank arm body 102. In one embodiment, the impact and wear protection article 300 is placed in the upper portion of the crankarm crank arm body 102 (the spindle end) and/or in the lower portion of the crank arm body 102 (the pedal end). In one embodiment, the impact and wear protection article 300 covers at least a portion of a side surface of the crank arm body 102.

In one embodiment, the impact and wear protection article 300 covers at least a portion of a back surface of the crank arm body 102 arm (the surface directed towards chainring 91 and/or the bicycle frame). In one embodiment, the impact and wear protection article 300 covers at least a portion of a top surface of the crank arm body 102 and/or at least a portion of a bottom surface of the crank arm body 102.

In one embodiment, the impact and wear protection article 300 could be placed around the pedal end and/or around the spindle end of the crank arm body 102. In one embodiment, the impact and wear protection article 300 extends over at least a portion of the front surface of the crank arm body 102. In one embodiment, the impact and wear protection article 300 can further extend over at least a portion of a side surface of the crank arm body 102 and/or over at least a portion of the back surface of the crank arm body 102 and/or over at least a portion of the top surface of the crank arm body 102 and/or over at least a portion of the bottom surface of the crank arm body 102.

In one embodiment, more than one impact and wear protection article 300 can be located at different portions of the crank arm body 102. In one embodiment, the impact and wear protection article 300 can be made in a suitable shape for crank arm body 102. In one embodiment, the placement of one or more than one impact and wear protection article 300 can be based on a combination of two or more of the described placements.

In general, the size, shape, thickness, material type, and amount of coverage and protection provided by impact and wear protection article 300 to the crank arm body 102 may be dependent upon the uses of the vehicle to which the crank is being mounted. For example, in a road bicycle set-up, the impact and wear protection article 300 could be a very thin, and very lightweight heel plate that only covers an area of the crank arm body 102 that is known to encounter wear due to rub from the user's shoes.

In contrast, on a mountain bike set-up (gravel bike, or other offroad use type of bicycle or e-bike), the impact and wear protection article 300 could be significantly more robust than that of the road bike as it would be used to cover one or more areas of the crank arm body to include areas known to encounter wear due to rub from the user's shoes, areas known to encounter obstacles such as rocks, roots, branches, etc., and also provide an amount of additional rigidity and structure to the crank arm body 102.

Thus, in one embodiment, the crank arm body could be similar in design and manufacture for a number of different bicycle use types, and the addition of the appropriate impact and wear protection article 300 would be used to complete the required and/or desired structural strength, rigidity, and wear needs for the vehicle use case. For example, a generic crank arm 100a that is to be used on a street bike would include a very thin and very lightweight impact and wear protection article 300, while the same generic crank arm 100a used on a mountain bike would be significantly more robust, cover one or more areas of the crank arm body to include areas known to encounter wear due to shoe rub, obstacles, and the like as well as providing additional rigidity and/or structure to the crank arm body 102 of the generic crank arm 100a.

Figure 5A:
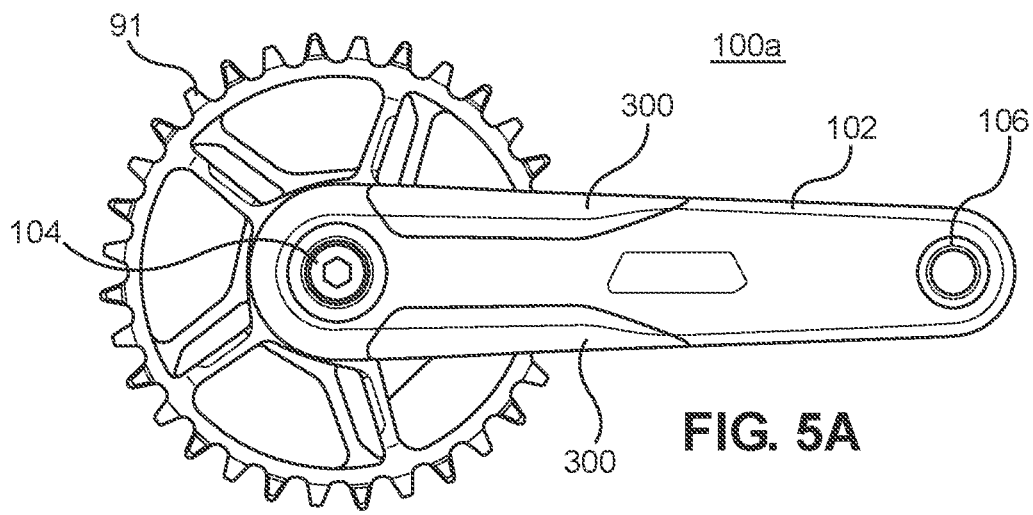
FIG. 5A is a side view of a crank arm with another style of impact and wear protection article located at a portion of a crank arm body, in accordance with an embodiment.

With reference now to FIG. 5A, a side view of a crank arm 100a with another style of impact and wear protection article 300 located at a portion of a crank arm body 102 is shown in accordance with an embodiment. In one embodiment, the impact and wear protection article 300 covers at least a portion of the front and side surface of the crank arm body 102 and is located toward the center and upper portion of the crankarm crank arm body 102 (e.g., closer to and/or partially around the spindle insert 104). In one embodiment, the impact and wear protection article 300 also covers at least a portion of the back side of crank arm body 102 (e.g., the side facing chainring 91 and/or the bicycle frame).

Figure 5B:
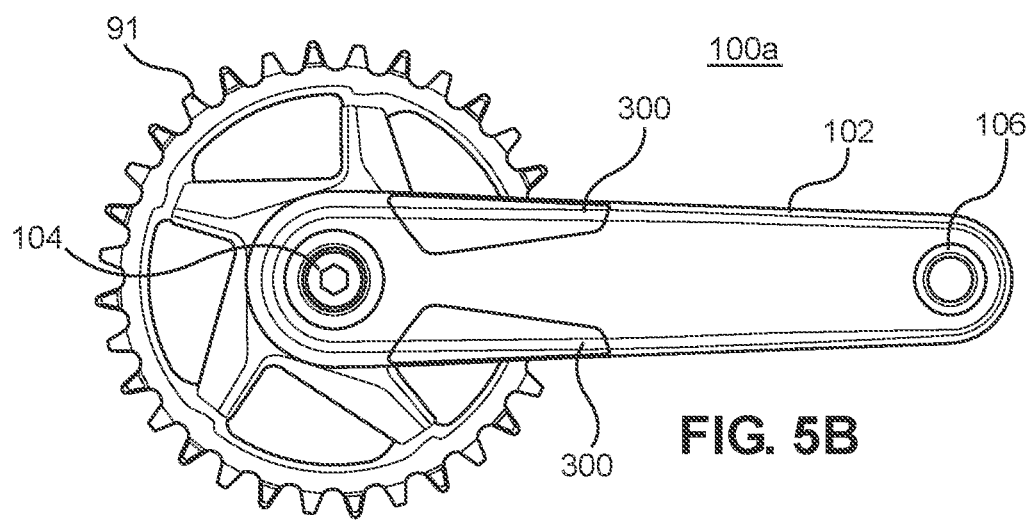
FIG. 5B is a side view of a crank arm with another style of impact and wear protection article located at a portion of the crank arm body, in accordance with an embodiment.

Referring now to FIG. 5B, a side view of a crank arm 100a with another style of impact and wear protection article 300 located at a portion of the crank arm body 102 is shown in accordance with an embodiment. In one embodiment, the impact and wear protection article 300 covers at least a portion of the front and side surface of the crank arm body 102 and is located toward the center and upper portion of the crankarm crank arm body 102 (e.g., closer to the spindle insert 104). In one embodiment, the impact and wear protection article 300 also covers at least a portion of the back side of crank arm body 102 (e.g., the side facing chainring 91).

Figure 5C:
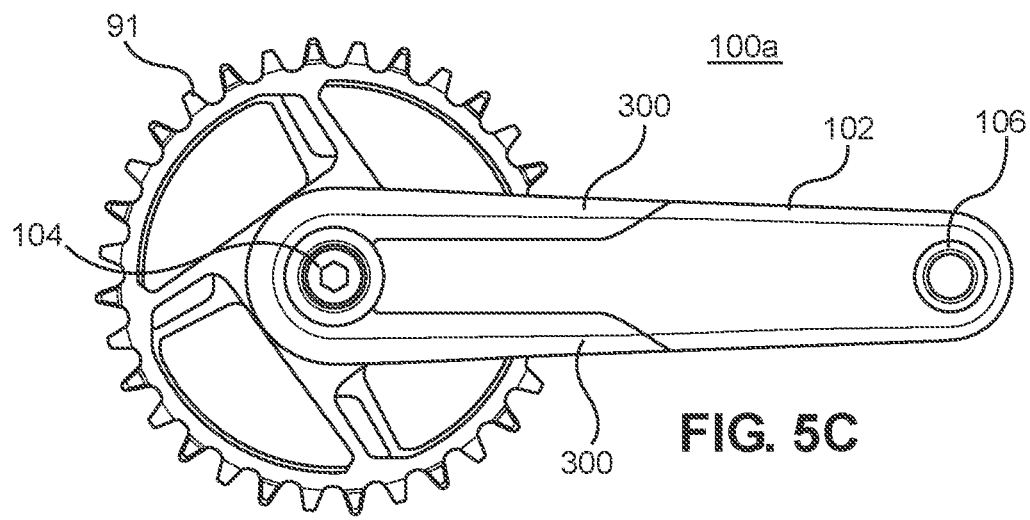
FIG. 5C is a side view of a crank arm with another style of impact and wear protection article located at a portion of the crank arm body, in accordance with an embodiment.

With reference now to FIG. 5C, a side view of a crank arm 100a with another style of impact and wear protection article 300 located at a portion of the crank arm body 102 is shown in accordance with an embodiment. In one embodiment, the impact and wear protection article 300 covers at least a portion of the front and side surface of the crank arm body 102 and is located close to the center of crank arm body 102 and wraps around the upper portion of the crankarm crank arm body 102 including the spindle insert 104. In one embodiment, the impact and wear protection article 300 also covers at least a portion of the back side of crank arm body 102 (e.g., the side facing chainring 91 and/or the bicycle frame).

Figure 6A:
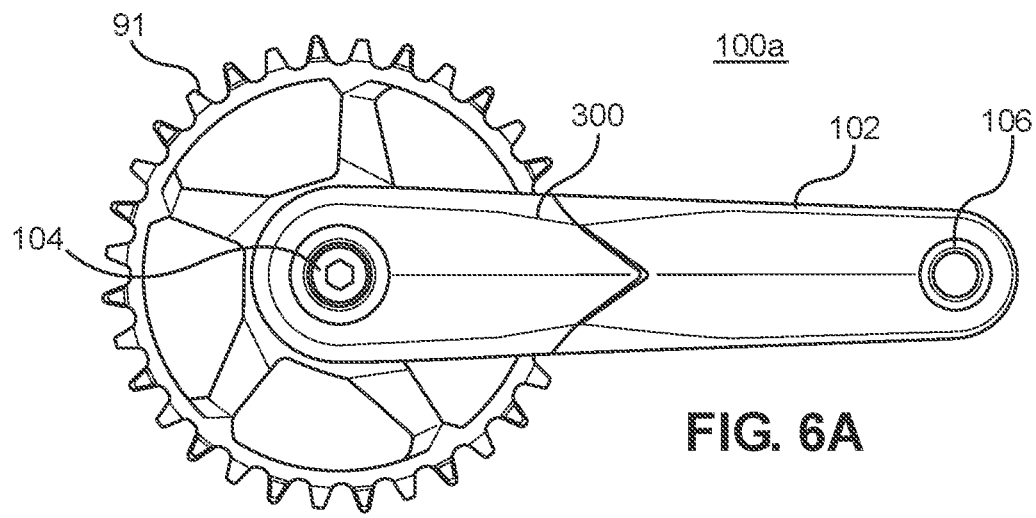
FIG. 6A is a side view of a crank arm with another style of impact and wear protection article located proximate to at least a portion of a spindle insert or a pedal insert, in accordance with an embodiment.

Referring now to FIG. 6A, a side view of a crank arm 100a with another style of impact and wear protection article 300 located proximate to at least a portion of a spindle insert 104 or a pedal insert 106 is shown in accordance with an embodiment. In one embodiment, the impact and wear protection article 300 covers a larger portion of the front and side surface of the crank arm body 102 than that of the impact and wear protection article 300 shown in FIGS. 5A-5C. In one embodiment, the impact and wear protection article 300 is located close to the center of crank arm body 102 and covers most of the upper portion of the crankarm crank arm body 102 including around the spindle insert 104. In one embodiment, the impact and wear protection article 300 also covers at least a portion of the back side of crank arm body 102 (e.g., the side facing chainring 91).

Figure 6B:
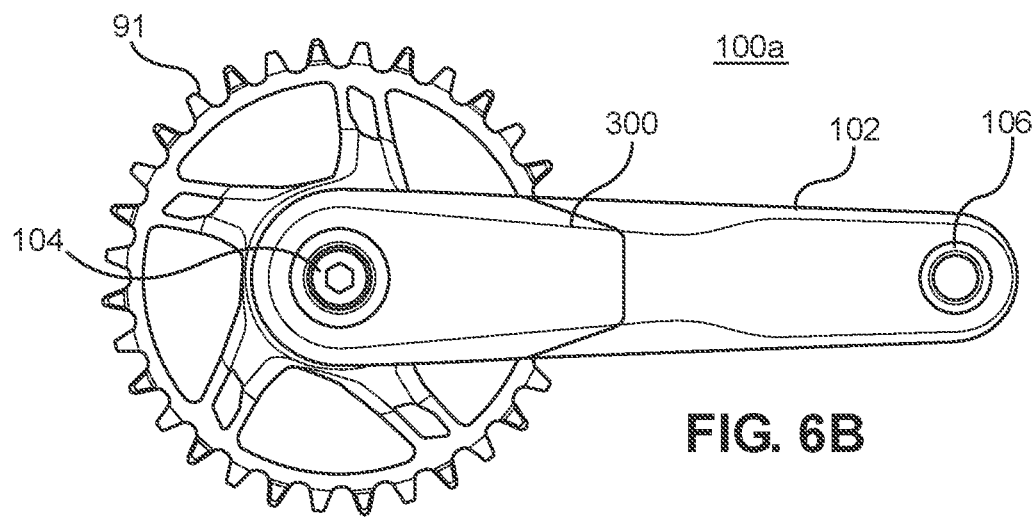
FIG. 6B is a side view of a crank arm with another style of impact and wear protection article located proximate to at least a portion of the spindle insert or the pedal insert, in accordance with an embodiment.

With reference now to FIG. 6B, a side view of a crank arm 100a with another style of impact and wear protection article 300 located proximate to at least a portion of the spindle insert 104 or the pedal insert 106 is shown in accordance with an embodiment. In one embodiment, the impact and wear protection article 300 covers a larger portion of the front and side surface of the crank arm body 102 than that of the impact and wear protection article 300 shown in FIGS. 5A-5C. In one embodiment, the impact and wear protection article 300 is located close to the center of crank arm body 102 and covers most of the upper portion of the crankarm crank arm body 102 including around the spindle insert 104. In one embodiment, the impact and wear protection article 300 also covers at least a portion of the back side of crank arm body 102 (e.g., the side facing chainring 91).

Figure 7A:
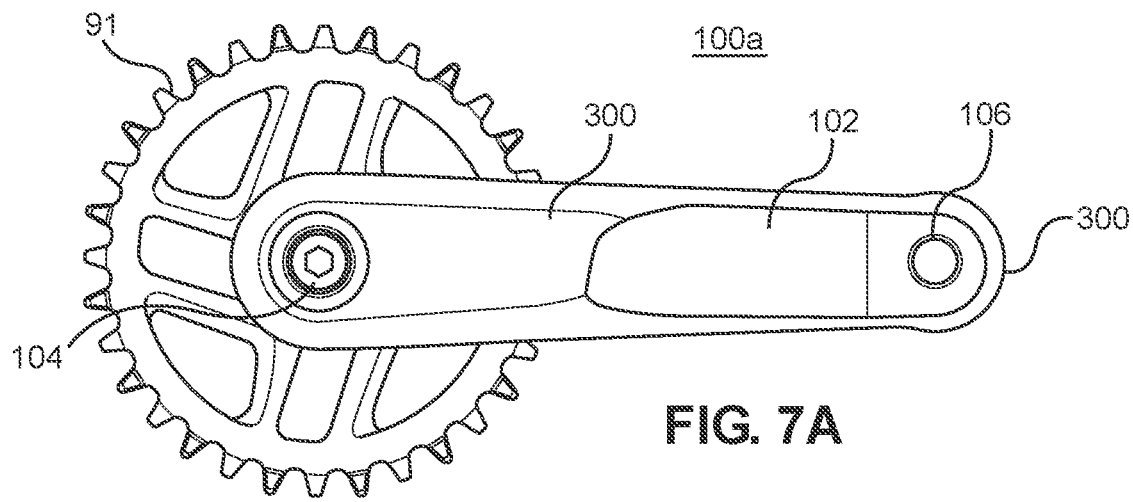
FIG. 7A is a side view of a crank arm with another style of impact and wear protection article located proximate to at least a portion of both the spindle insert and the pedal insert, in accordance with an embodiment.

Referring now to FIG. 7A, a side view of a crank arm 100a with another style of impact and wear protection article 300 located proximate to at least a portion of both the spindle insert 104 and the pedal insert 106 is shown in accordance with an embodiment. In one embodiment, the impact and wear protection article 300 is a single piece that covers at least a portion of the entire perimeter of crank arm body 102 and a large portion of the front and side surface of the crank arm body 102 similar to the coverage shown in FIGS. 6A-6B and most of the upper portion of the crankarm crank arm body 102 including around the spindle insert 104. In one embodiment, the impact and wear protection article 300 also covers at least a portion of the back side of crank arm body 102 (e.g., the side facing chainring 91).

Figure 7B:
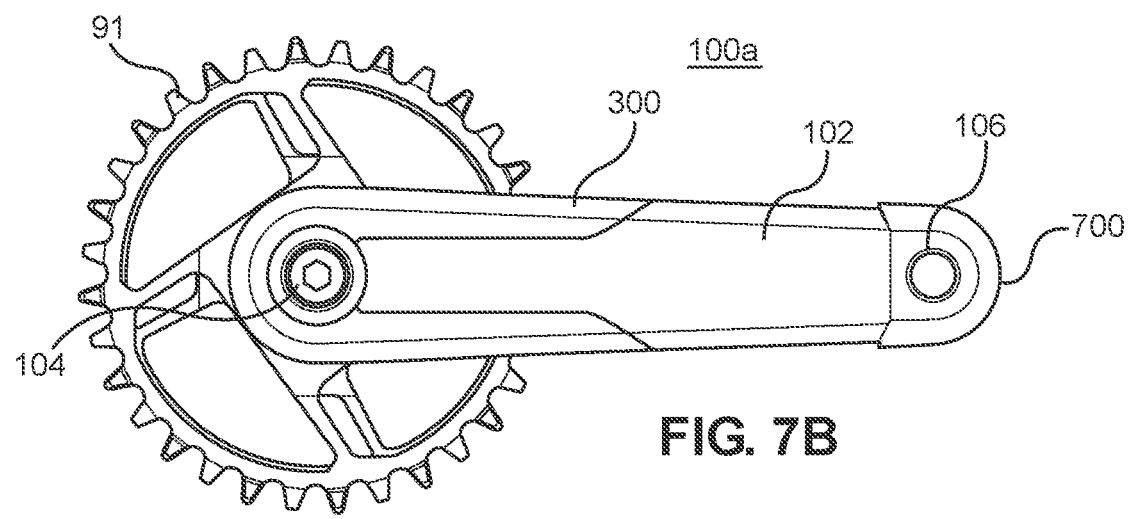
FIG. 7B is a side view of a crank arm with plurality of impact and wear protection articles, in accordance with an embodiment.

With reference now to FIG. 7B, a side view of a crank arm 100a with plurality of impact and wear protection articles 300 is shown in accordance with an embodiment. In one embodiment, one impact and wear protection article 300 is used to cover at least a portion the front and side surface of the crank arm body 102 including around the spindle insert 104. In one embodiment, at least a second impact and wear protection article 300 is used to cover at least a portion the front and side surface of the crank arm body 102 including around the pedal insert 106. In one embodiment, one or more of the impact and wear protection articles also cover at least a portion of the back side of crank arm body 102 (e.g., the side facing chainring 91).

In the following discussion of FIGS. 8A-14B, a number of different pedal insert 106 and/or spindle insert 104 designs are shown with partially and/or fully integrated impact and wear protection article 300. Further, in different embodiments, one or more than one impact and wear protection article 300 may be mounted about a perimeter of crank arm body 102 using a recess such as recess 1305 of FIG. 13A-14B formed in pedal insert 106, and/or spindle insert 104, and/or crank arm body 102.

Further, although a number of different pedal insert 106 and/or spindle insert 104 design solutions are shown in conjunction with partially and/or fully integrated impact and wear protection article 300, it should be appreciated that in different embodiments, the impact and wear protection article 300 may be an individual part that is coupled with the pedal insert 106 and/or the spindle insert 104.

In one embodiment, the impact and wear protection article 300 is a plate and/or a strip that is integral with pedal insert 106 and/or spindle insert 104. In one embodiment the impact and wear protection article 300 is flush with the surface of the crank arm body 102. In another embodiment, the impact and wear protection article 300 extends beyond the surface of the crank arm body 102. In one embodiment, the impact and wear protection article 300 is co-molded with the crank arm body 102.

With reference now to FIG. 8A, a perspective view of the crank arm 100a with an impact and wear protection article 300 formed in one or both of the spindle insert 104 and the pedal insert 106 is shown in accordance with an embodiment. FIG. 8B is a cross-section view of a section of the crank arm 100a of FIG. 8A. In one embodiment, the impact and wear protection article 300 covers an area of the crank arm body 102 that is known to encounter wear due to rub from the user's shoe.

In one embodiment, a first impact and wear protection article 300 is formed as part of spindle insert 104 (or placed next to spindle insert 104). In one embodiment, first impact and wear protection article 300 is present at the time of the formation of the crank arm body 102. As such, the impact and wear protection article 300 is fixedly integrated with crank arm body 102. In one embodiment, first impact and wear protection article 300 is flush with the surface plane of crank arm body 102. In one embodiment, first impact and wear protection article 300 projects above the surface plane of crank arm body 102.

In one embodiment, a second impact and wear protection article 300 is formed as part of pedal insert 106 (or placed next to pedal insert 106). In one embodiment, second impact and wear protection article 300 is present at the time of the formation of the crank arm body 102. As such, the second impact and wear protection article 300 is fixedly integrated with crank arm body 102. In one embodiment, second impact and wear protection article 300 is flush with the surface plane of crank arm body 102. In one embodiment, second impact and wear protection article 300 projects above the surface plane of crank arm body 102. Although two impact and wear protection articles are shown, it should be appreciated that in another embodiment, crank arm body may only include one impact and wear protection article 300.

In one embodiment, the crank arm body 102 of FIG. 8A could include a second impact and wear protection article 300 coupled with the same insert (or with the other insert) that is similar to the impact and wear protection article 300 shown in FIGS. 9A, 10A, 11A, 12A, 13A, and 14A.

With reference now to FIG. 9A, a perspective view of the crank arm 100a with another style of impact and wear protection article 300 formed in one or both of the spindle insert 104 and the pedal insert 106 is shown in accordance with an embodiment. FIG. 9B is a cross-section view of a section of the crank arm 100a of FIG. 9A in accordance with an embodiment. In one embodiment, the impact and wear protection article 300 covers at least a portion of one end of the crank arm body 102. In one embodiment, a plurality of impact and wear protection articles cover at least a portion of both ends of the crank arm body 102.

In one embodiment, impact and wear protection article 300 is formed as part of (or placed next to) pedal insert 106 (or spindle insert 104). In one embodiment, impact and wear protection article 300 is present at the time of the formation of the crank arm body 102. As such, the impact and wear protection article 300 is fixedly integrated with crank arm body 102. In one embodiment, impact and wear protection article 300 would be flush with the outer perimeter of a portion of crank arm body 102. In one embodiment, impact and wear protection article 300 would project above the outer perimeter of a portion of crank arm body 102.

In one embodiment, the crank arm body 102 of FIG. 9A could include a second impact and wear protection article 300 coupled with the same insert (or with the other insert) that is similar to the impact and wear protection article 300 shown in FIGS. 8A, 10A, 11A, 12A, 13A, and 14A.

Figure 10B:
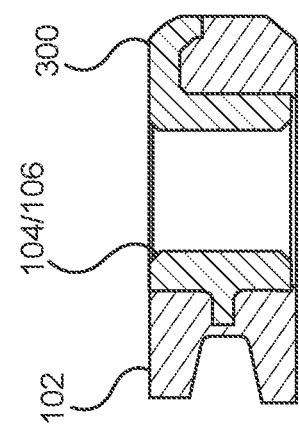
FIG. 10B is a cross-section view of a section of the crank arm of FIG. 10A, in accordance with an embodiment.
Figure 10A:
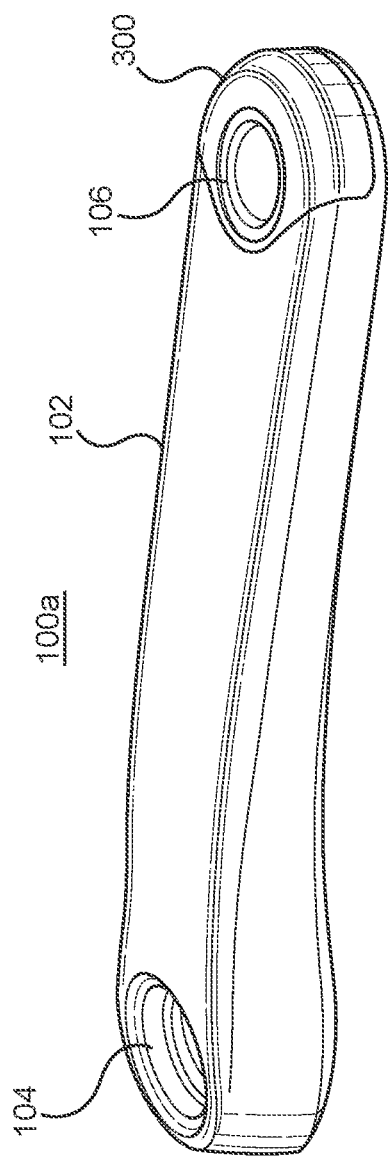
FIG. 10A is a perspective view of the crank arm with another style of impact and wear protection article formed in one or both of the spindle insert and the pedal insert, in accordance with an embodiment.

With reference now to FIG. 10A, a perspective view of the crank arm 100a with another style of impact and wear protection article 300 formed in one or both of the spindle insert 104 and the pedal insert 106 is shown in accordance with an embodiment. FIG. 10B is a cross-section view of a section of the crank arm 100a of FIG. 10A shown in accordance with an embodiment. In one embodiment, the impact and wear protection article 300 covers at least a portion of one end of the crank arm body 102. In one embodiment, a plurality of impact and wear protection articles cover at least a portion of both ends of the crank arm body 102.

In one embodiment, impact and wear protection article 300 is formed as part of (or placed next to) pedal insert 106 (or spindle insert 104). In one embodiment, impact and wear protection article 300 is present at the time of the formation of the crank arm body 102. As such, the impact and wear protection article 300 would be fixedly integrated with crank arm body 102. In one embodiment, impact and wear protection article 300 is flush with one or more of the front surface, side surfaces, and outer perimeter of a portion of crank arm body 102. In one embodiment, impact and wear protection article 300 would project above one or more of the front surface, side surfaces, and outer perimeter of a portion of crank arm body 102.

In one embodiment, the crank arm body 102 of FIG. 10A could include a second impact and wear protection article 300 coupled with the same insert (or with the other insert) that is similar to the impact and wear protection article 300 shown in FIGS. 8A, 9A, 11A, 12A, 13A, and 14A.

Figure 11B:
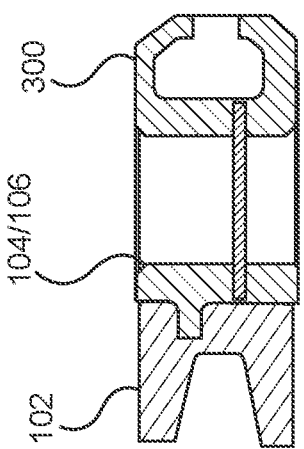
FIG. 11B is a cross-section view of a section of the crank arm of FIG. 11A, in accordance with an embodiment.
Figure 11A:
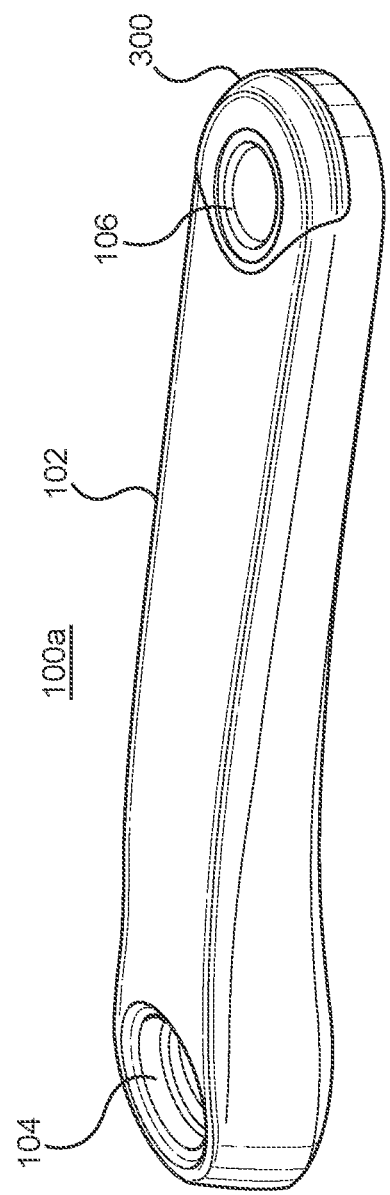
FIG. 11A is a perspective view of the crank arm with another style of impact and wear protection article formed in one or both of the spindle insert and the pedal insert, in accordance with an embodiment.

With reference now to FIG. 11A, a perspective view of the crank arm 100a with another style of impact and wear protection article 300 formed in one or both of the spindle insert 104 and the pedal insert 106 is shown in accordance with an embodiment. FIG. 11B is a cross-section view of a section of the crank arm 100a of FIG. 11A shown in accordance with an embodiment. In one embodiment, the impact and wear protection article 300 covers at least a portion of one end of the crank arm body 102. In one embodiment, a plurality of impact and wear protection articles cover at least a portion of both ends of the crank arm body 102.

In one embodiment, impact and wear protection article 300 is formed as part of (or placed next to) pedal insert 106 (or spindle insert 104). In one embodiment, impact and wear protection article 300 is present at the time of the formation of the crank arm body 102. As such, the impact and wear protection article 300 would be fixedly integrated with crank arm body 102. In one embodiment, impact and wear protection article 300 is flush with one or more of the front surface, side surfaces, rear surface, and outer perimeter of a portion of crank arm body 102. In one embodiment, impact and wear protection article 300 would project above one or more of the front surface, side surfaces, rear surface, and outer perimeter of a portion of crank arm body 102.

In one embodiment, the crank arm body 102 of FIG. 11A could include a second impact and wear protection article 300 coupled with the same insert (or with the other insert) that is similar to the impact and wear protection article 300 shown in FIGS. 8A, 9A, 10A, 12A, 13A, and 14A.

Figure 12A:
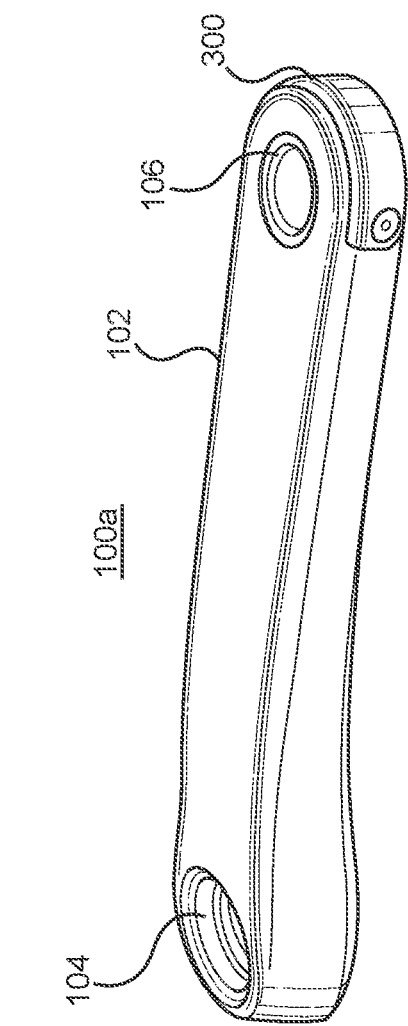
FIG. 12A is a perspective view of the crank arm with another style of impact and wear protection article formed in one or both of the spindle insert and the pedal insert, in accordance with an embodiment.
Figures 12B, 12C:
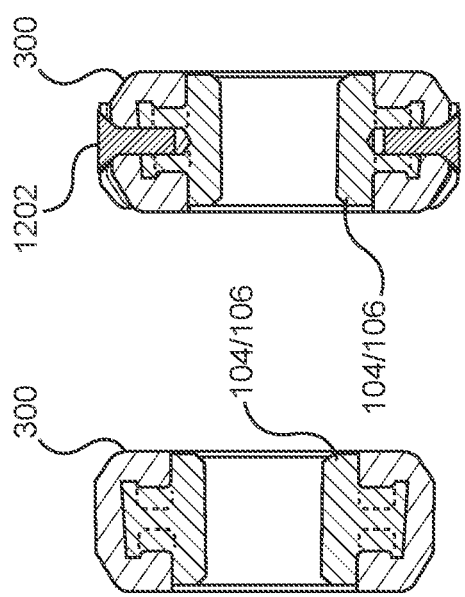
FIG. 12B is a cross-section view of a section of the crank arm of FIG. 12A, in accordance with an embodiment.
FIG. 12C is a cross-section view of a section of the crank arm of FIG. 12A having a fastener, in accordance with an embodiment.

With reference now to FIG. 12A, a perspective view of the crank arm 100a with another style of impact and wear protection article 300 formed in one or both of the spindle insert 104 and the pedal insert 106 is shown in accordance with an embodiment. FIG. 12B is a cross-section view of a section of the crank arm 100a of FIG. 12A shown in accordance with an embodiment. FIG. 12C is a cross-section view of a section of the crank arm 100a of FIG. 12A having a fastener shown in accordance with an embodiment.

In one embodiment, the impact and wear protection article 300 covers at least a portion of one end of the crank arm body 102. In one embodiment, a plurality of impact and wear protection articles cover at least a portion of both ends of the crank arm body 102.

In one embodiment, impact and wear protection article 300 is coupled with the pedal insert 106 and/or the spindle insert 104 with at least one fastener 1202 (or adhesive, tape, press fit, or the like). In one embodiment, fastener 1202 is a screw. In one embodiment, fastener 1202 is a bolt. In one embodiment, fastener 1202 is a clip.

In one embodiment, impact and wear protection article 300 is flush with one or more of the front surface, side surfaces, rear surface, and outer perimeter of a portion of crank arm body 102. In one embodiment, impact and wear protection article 300 would project above one or more of the front surface, side surfaces, rear surface, and outer perimeter of a portion of crank arm body 102.

In one embodiment, the crank arm body 102 of FIG. 12A could include a second impact and wear protection article 300 coupled with the same insert (or with the other insert) that is similar to the impact and wear protection article 300 shown in FIGS. 8A, 9A, 10A, 11A, 13A, and 14A.

Figure 13A:
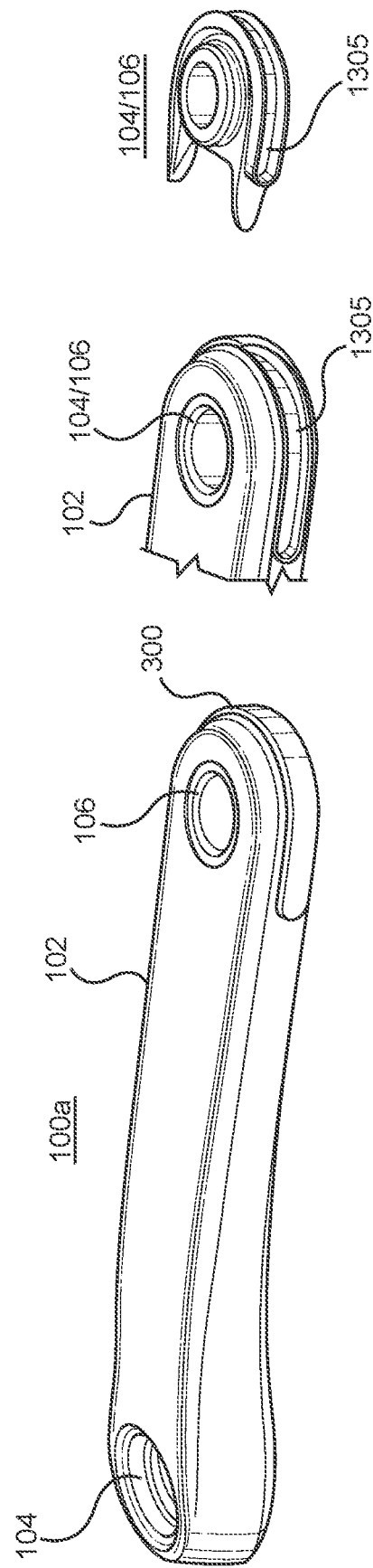
FIG. 13A is a perspective view of the crank arm with another style of impact and wear protection article in a grove formed in one or both of the spindle insert and the pedal insert, in accordance with an embodiment.
Figures 13B, 13C:
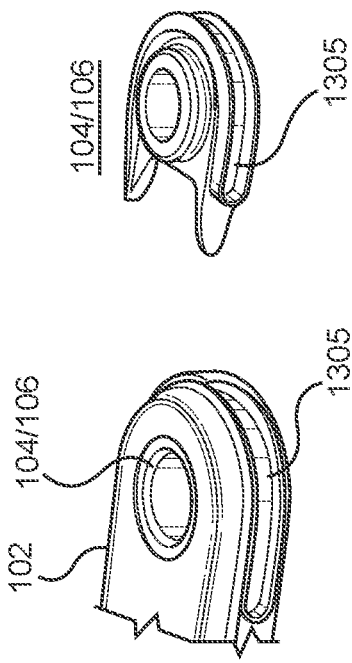
FIG. 13B is a perspective view of a section of the crank arm of FIG. 13A, in accordance with an embodiment.
FIG. 13C is a perspective view of a section of the grooved interface used in the crank arm of FIG. 13A, in accordance with an embodiment.

Referring now to FIG. 13A, a perspective view of the crank arm 100a with another style of impact and wear protection article 300 in a groove 1305 formed in one or both of the spindle insert 104 and the pedal insert 106 is shown in accordance with an embodiment. FIG. 13B is a perspective view of a section of the crank arm 100a of FIG. 13A shown in accordance with an embodiment. FIG. 13C is a perspective view of a section of the grooved interface used in the crank arm 100a of FIG. 13A shown in accordance with an embodiment.

In one embodiment, impact and wear protection article 300 is installed in the groove 1305 of the pedal insert 106 and/or the spindle insert 104. In one embodiment, impact and wear protection article 300 is held in the groove 1305 with at least one fastener, clip, adhesive, tape, press fit, or the like.

In one embodiment, impact and wear protection article 300 is flush with one or more of the front surface, side surfaces, rear surface, and outer perimeter of a portion of crank arm body 102. In one embodiment, impact and wear protection article 300 would project above one or more of the front surface, side surfaces, rear surface, and outer perimeter of a portion of crank arm body 102.

In one embodiment, the crank arm body 102 of FIG. 13A could include a second impact and wear protection article 300 coupled with the same insert (or with the other insert) that is similar to the impact and wear protection article 300 shown in FIGS. 8A, 9A, 10A, 11A, 12A, and 14A.

Figure 14B:
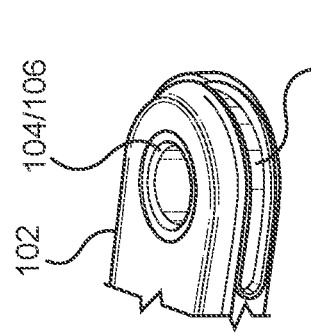
FIG. 14B is a perspective view of a section of the crank arm of FIG. 14A, in accordance with an embodiment.
Figure 14A:
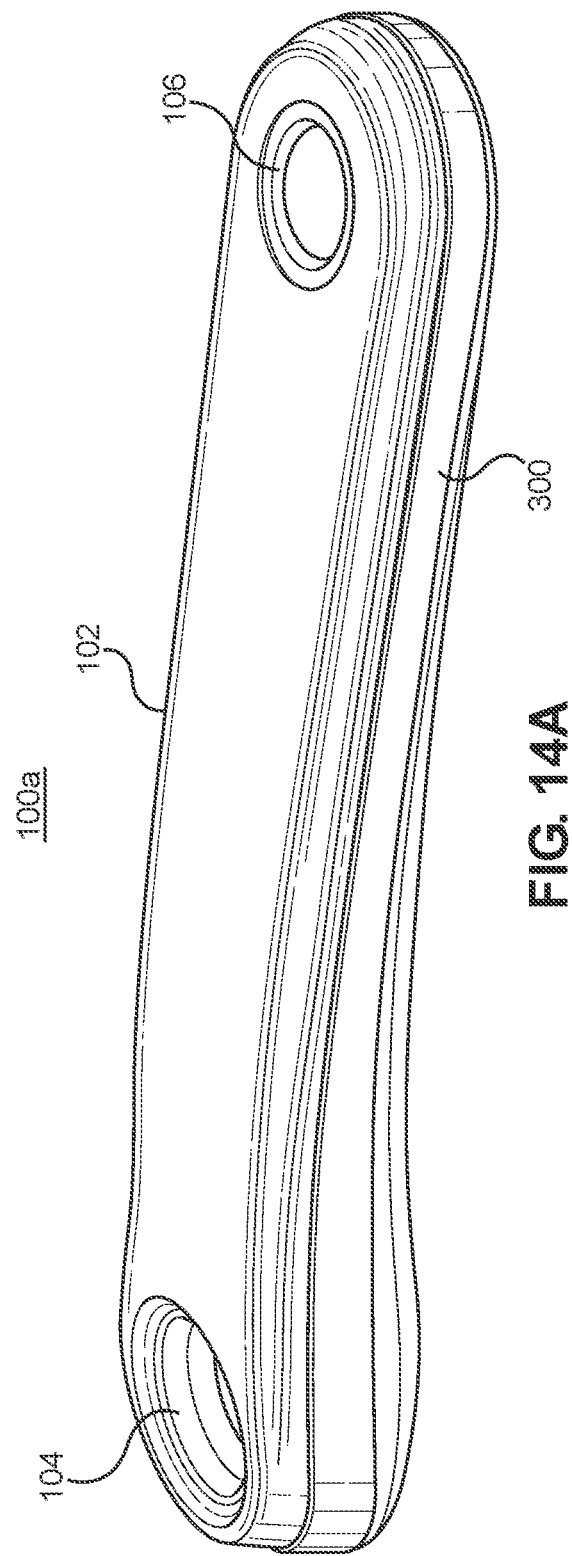
FIG. 14A is a perspective view of the crank arm with another style of impact and wear protection article in a grove formed around the exterior of the crank arm, in accordance with an embodiment.

With reference now to FIG. 14A, a perspective view of the crank arm 100a with another style of impact and wear protection article 300 in a grove formed around the exterior of the crank arm 100a is shown in accordance with an embodiment. FIG. 14B is a perspective view of a section of the crank arm 100a of FIG. 14A shown in accordance with an embodiment.

In one embodiment, impact and wear protection article 300 is installed in the groove around the exterior of the crank arm 100a. In one embodiment, impact and wear protection article 300 is held in the groove 1305 with at least one fastener, clip, adhesive, tape, press fit, or the like.

In one embodiment, impact and wear protection article 300 is flush with one or more of the front surface, side surfaces, rear surface, and outer perimeter of a portion of crank arm body 102. In one embodiment, impact and wear protection article 300 projects above one or more of the front surface, side surfaces, rear surface, and outer perimeter of a portion of crank arm body 102.

In one embodiment, the crank arm body 102 of FIG. 14A could include a second impact and wear protection article 300 coupled with the same insert (or with the other insert) that is similar to the impact and wear protection article 300 shown in FIGS. 8A, 9A, 10A, 11A, 12A, and 13A.

In one embodiment, a crank arm body 102 could include any number and different combinations of the impact and wear protection articles shown and described in any or all of FIGS. 3-14B.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A crank arm comprising:
   a crank body, said crank body having a front surface, a back surface, a first side surface and a second side surface, said crank body having an upper portion proximate a spindle insert, a lower portion proximate a pedal insert and a middle portion disposed between said upper portion and said lower portion;
   a first recessed region formed into said crank body;
   an impact and wear protection article coupled with said crank body, said impact and wear protection article disposed within said first recessed region and at least partially in said middle portion of said crank body and at least partially covering said front surface of said crank body; and
   a second recessed region formed in the pedal insert and/or in the spindle insert and disposed about a perimeter of said crank body to accommodate at least a portion of said impact and wear protection article.

2. The crank arm of claim 1, wherein said impact and wear protection article is selected from a group consisting of a plate and a strip.

3. The crank arm of claim 1, wherein said impact and wear protection article is formed from a material selected from a group consisting of a metal, a metal alloy, a rubber, a plastic, a composite material, or a combination thereof.

4. The crank arm of claim 1, wherein said impact and wear protection article is removably attached to the crank arm body.

5. The crank arm of claim 1, further comprising:
   wherein said impact and wear protection article is further disposed at least partially in said upper portion of said crank body.

6. The crank arm of claim 1, further comprising:
   wherein said impact and wear protection article is further disposed at least partially in said lower portion of said crank body.

7. The crank arm of claim 1, further comprising:
   wherein said impact and wear protection article is further disposed at least partially surrounding said spindle insert of said crank body.

8. The crank arm of claim 1, further comprising:
   wherein said impact and wear protection article is further disposed at least partially surrounding said pedal insert of said crank body.

9. The crank arm of claim 1, further comprising:
   wherein said impact and wear protection article extends over at least a portion of said first side surface of said crank body.

10. The crank arm of claim 1, further comprising:
    wherein said impact and wear protection article extends over at least a portion of said back surface of said crank body.

11. The crank arm of claim 1, further comprising:
    wherein said impact and wear protection article extends over at least a portion of said second side surface of said crank body.

12. The crank arm of claim 1, further comprising:
    said impact and wear protection article shaped such that, when disposed in said first recessed region of said crank body, said impact and wear protection article will match a contour of said crank body.

13. The crank arm of claim 1, further comprises:
    said spindle insert comprising a groove to accommodate at least a portion of said impact and wear protection article.

14. The crank arm of claim 1, wherein said impact and wear protection article is co-molded with said crank body.

* * * * *